United States Patent Office 3,576,800
Patented Apr. 27, 1971

3,576,800
1-ACYL-3-INDOLYL ALIPHATIC ACID DERIVA-
TIVES AND THEIR METHOD OF PREPARATION
Hisao Yamamoto, Nishinomiya-shi, and Masaru Nakao,
Osaka, Japan, assignors to Sumitomo Chemical Company, Ltd., Osaka, Japan
No Drawing. Filed May 2, 1967, Ser. No. 635,362
Claims priority, application Japan, May 12, 1966,
41/30,306; June 27, 1966, 41/42,039; June 30,
1966, 41/42,721, 41/42,272; July 8, 1966, 41/
44,723, 41/44,724; Aug. 1 1966, 41/50,691; Aug.
19, 1966, 41/54,675, 41/54,674; Dec. 15, 1966,
41/82,480; Dec. 16, 1966, 41/82,649, 41/82,650;
Dec. 20, 1966, 41/83,748; Jan. 6, 1967, 42/1,351,
42/1,352; Jan. 7, 1967, 42/1,499; Jan. 16, 1967,
42/3,223, 42/3,224; Jan. 17, 1967, 42/3,530,
42/3,531
Int. Cl. C07d 27/56
U.S. Cl. 260—240                         19 Claims

ABSTRACT OF THE DISCLOSURE

A 1-acyl-3-indolyl aliphatic acid derivative having remarkable anti-inflammatory, antipyretic and analgesic actions which is characterized in that said acyl substituent is aralkylcarbonyl or aralkenylcarbonyl whose carbon chain has up to 5 carbon atoms, and process for producing the compound.

BACKGROUND OF THE INVENTION (1) Field of the invention

The present invention relates to novel N-substituted indole derivatives having high anti-inflammatory, antipyretic and analgesic activities and to processes for producing the same. More particularly, the present invention relates to novel 1-acyl-3-indolyl aliphatic acid derivatives and processes for producing the same.

(2) Prior art

Of the developed non-steroidal anti-inflammatory compounds, 1-(p-chlorobenzoyl)-2-methyl-5-methoxy-3-indolylacetic acid is greatest in activity. But it is high in toxicity. The present inventors also observed that even when 10 mg./kg. of said compound was orally administered, a rat showed an occult bleeding. In addition thereto, all the conventional anti-inflammatory compounds tend to promote the bleeding of digestive organs and not few examples have been reported that perfolations of the stomach and intestines brought one to death. Further 1,2 - diphenyl - 3,5 - dioxo - 4 - n - butylpyrazolidine (phenylbutazone), which is most widely used as antiphlogistic at present, has low activity in comparison to its high acute toxicity and hence is considerably small in therapeutic ratio.

The synthesis of indole derivatives having acyl groups at the N-positions is described in, for example, Elderfield: "Heterocyclic Compounds," vol. 3 (1952), chapter 1, pages 1–247, and W. C. Sumpter and F. M. Miller: "Heterocyclic Compounds with Indole and Carbazole Systems" (1954), pages 1–69. 1-Substituted acyl groups of 1-acyl-indole derivatives are so easily hydrolyzed by acid or alkali that it has been considered impossible to obtain 1-acyl-indole derivatives directly from corresponding $N^1$-acylated phenylhydrazine derivatives by Fischer's indolization. Suvorov et al. [Suvorov et al.: Doklady Acad. Nauk S.S.S.R. 136, 840 (1961), Chem. Abstr., 55, 17621 (1961), J. Gen. Chem., U.S.S.R., 28, 1058 (1958)] have recently reported this problem as follows:

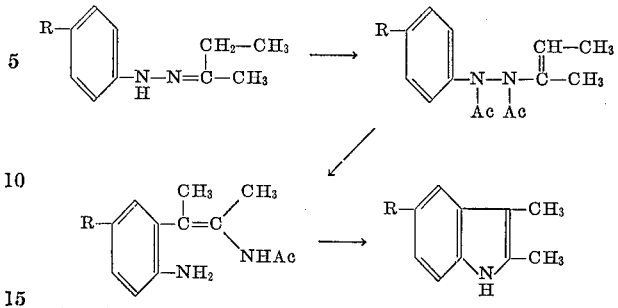

They have explained that an important requirement for indole formation is the deacylation of the $N^1$-acyl group of hydrazine derivative, which frees a p-electron pair on the $N^1$-nitrogen atom.

SUMMARY OF THE INVENTION

The present inventors found that novel 1-acyl-3-indolyl aliphatic acid derivatives having high anti-inflammatory, anti-pyretic and analgesic activities were prepared by novel or known processes.

One object of the present invention is to provide novel 1-acyl-3-indolyl aliphatic acid derivatives having high anti-inflammatory, anti-pyretic and analgesic activities and processes for producing such derivatives. Another object of the present invention is to provide processes for economically manufacturing these compounds in a high yield. A further object of the present invention is to provide a novel pharmaceutical composition containing these compounds as the effective ingredient. Still further objects will be apparent from the following description.

In order to accomplish these objects, the present invention provides novel 1-acyl-3-indolyl aliphatic acid derivatives of the formula:

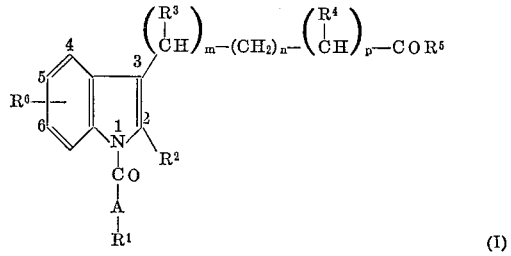

wherein $R^1$ is an unsubstituted or a lower alkyl-, lower alkoxy-, lower alkylthio-, nitro-, cyano- or halogen-substituted aromatic ring group, each of said alkyl, alkoxy and alkylthio substituents containing up to 4 carbon atoms, or an unsubstituted or a methyl-, ethyl- or halogen-substituted 5- or 6-membered heterocyclic ring group containing an oxygen, sulfur or nitrogen atom; $R^2$ and $R^3$ each are hydrogen atoms or alkyl groups having up to 3 carbon atoms; $R^4$ is a hydrogen atom, a carboxy group or an alkoxycarbonyl group having up to 4 carbon atoms; $R^5$ is an alkoxy group having up to 4 carbon atoms, a benzyloxy group, a tetrahydropyranyloxy group, an amino group or a hydroxy group; $R^6$ is an alkyl group having up to 4 carbon atoms, an alkoxy group having up to 4 carbon atoms, an alkylthio group having up to 4 carbon atoms, a nitro group, an alkenyl group having up to 4 carbon atoms, an alkenyloxy group having up to 4 carbon atoms, a halogen atom or a hydrogen atom;

A is an unsaturated saturated hydrocarbon chain having up to 5 carbon atoms, an unsubstituted unsaturated hydrocarbon chain having up to 5 carbon atoms, a halogen-substituted saturated hydrocarbon chain having up to 5 carbon atoms, a halogen-substituted unsaturated hydrocarbon chain having up to 5 carbon atoms, a phenyl-substituted saturated hydrocarbon chain having up to 5 carbon atoms or a phenyl-substituted unsaturated hydrocarbon chain having up to 5 carbon atoms, the hydrocarbon chain being a straight one or a branched one; $m$ and $p$ each are 0 or 1; and $n$ is 0 or an integer of from 1 to 3.

Further, the present invention provides a process for producing novel 1-acyl-3-indolyl aliphatic acid derivatives represented by the Formula 1, which comprises reacting an $N^1$-acylated phenylhydrazine derivative of the formula:

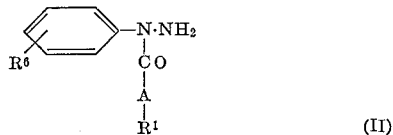

(II)

werein $R^1$, $R^6$ and A have the same meanings as defined above, with an aliphatic acid derivative of the formula:

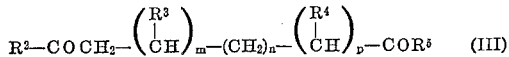

(III)

wherein $R^2$, $R^3$, $R^4$, $R^5$, $m$, $n$ and $p$ have the same meanings as identified above.

Still further, the present invention provides a process for producing novel 1-acyl-3-indolyl aliphatic acid derivatives represented by the Formula I, which comprises decomposing an $N^1$-acylated phenylhydrazone derivative of the formula:

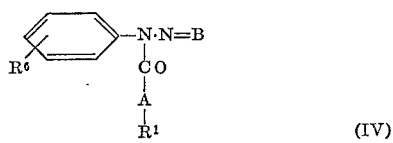

(IV)

fied above,, and B is a ketone or aldehyde residue, with a decomposing agent to yield an $N^1$-acylated phenylhydrazine derivative of the formula:

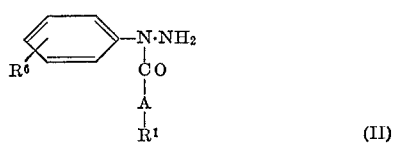

(II)

wherein $R^1$, $R^6$ and A have the same meanings as identified above, and reacting the resultant $N^1$-acylated phenylhydrazine derivative with an aliphatic acid derivative represented by the Formula III to yield the 1-acyl-3-indolyl aliphatic acid derivative (I).

Still further, the present invention provides a process for producing novel 1-acyl-3-indolyl aliphatic acid derivatives represented by the Formula I, which comprises reacting a phenylhydrazone derivative of the formula:

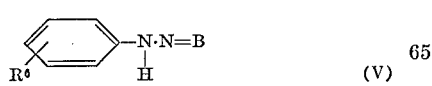

(V)

wherein $R^6$ and B have the same meanings as identified above, with a compound having the formula:

(VI)

wherein $R^1$ and A have the same meanings as identified above and Y represents a halogen or an ester residue, to yield an $N^1$-acylated phenylhydrazone derivative represented by the Formula IV, decomposing the resultant $N^1$-acylated phenylhydrazone derivative with a decomposing agent to give an $N^1$-acylated phenylhydrazine derivative represented by the Formula II, and reacting the resultant $N^1$-acylated phenylhydrazine derivative with an aliphatic acid derivative represented by the Formula III to yield the 1-acyl-3-indolyl aliphatic acid derivative (I).

Still further, the present invention provides a process for producing novel 1-acyl-3-indolyl aliphatic acid derivatives of the Formula I; which comprises reacting a phenylhydrazone derivative of the Formula V with a compound having the Formula VI to yield an $N^1$-acylated phenylhydrazine derivative of the Formula II, and reacting the resultant $N^1$-acylated phenylhydrazine derivative of the Formula II with an aliphatic acid compound of the Formula III to yield an 1-acyl-3-indolyl aliphatic acid derivative (I).

Still further, the present invention provides a process for producing novel 1-acyl-3-indolyl aliphatic acid derivatives of the Formula I, which comprises reacting an $N^1$-acylated phenylhydrazone derivative of the Formula IV with an aliphatic acid derivative of the Formula III to yield the 1-acyl-3-indolyl aliphatic acid derivative of the Formula I.

Still further, the present invention provides a process for producing novel 1-acyl-3-indolyl aliphatic acid derivatives of the Formula I, which comprises reacting a phenylhydrazone derivative of the Formula V with a compound having the Formula VI to yield an $N^1$-acylated phenylhydrazone derivative of the Formula IV and reacting the resultant $N^1$-acylated phenylhydrazone derivative (IV) with an aliphatic acid derivative of the Formula III to yield the 1-acyl-3-indolyl aliphatic acid derivative (I).

Still further, the present invention provides a process for producing novel 1-acyl-3-indolyl aliphatic acid derivatives of the Formula VII:

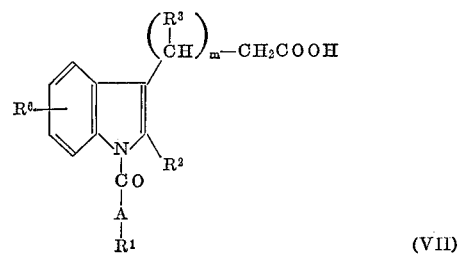

(VII)

wherein $R^1$, $R^2$, $R^3$, $R^5$, A and $m$ have the same meanings as identified above, which comprises reacting an $N^1$-acylated phenylhydrazine derivative of the Formula II with a compound of the formula:

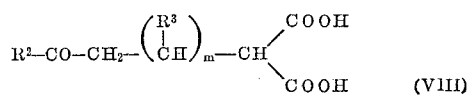

(VIII)

wherein $R^2$, $R^3$ and $m$ have the same meanings as identified above, to yield the 1-acyl-3-indolyl aliphatic acid derivative (VII).

Still further, the present invention provides a process for producing novel 1-acyl-3-indolyl aliphatic acid derivatives of the Formula VII, which comprises reacting an $N^1$-acylated phenylhydrazone derivative of the Formula IV with a compound of the Formula VIII to yield the 1- acyl-3-indolyl aliphatic acid derivative of the Formula VII.

Still further, the present invention provides a process for producing novel 1-acyl-3-indolylacetic acid derivatives of the formula:

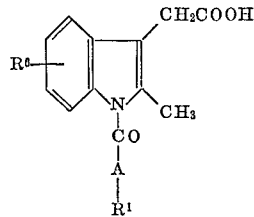

(IX)

wherein $R^1$, $R^6$ and A have the same meanings as identified above, which comprises reacting an $N^1$-acylated phenylhydrazine derivative of the Formula II with acetosuccinic acid or 2-ketoadipic acid to yield the 1-acyl-3-indolylacetic acid derivative of the Formula IX.

Still further, the present invention provides a process for producing novel 1-acyl-3-indolylacetic acid derivatives of the Formula IX, which comprises reacting an $N^1$-acylated phenylhydrazone derivative of the Formula IV with acetosuccinic acid or 2-ketoadipic acid to yield the 1-acyl-3-indolylacetic acid (IX).

Still further, the present invention provides a process for producing novel 1-acyl-3-indolyl aliphatic acid derivatives of the Formula I, which comprises reacting a phenylhydrazine derivative of the formula:

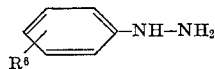

(X)

wherein $R^6$ has the same meaning as identified above, with a compound having the Formula VI to yield an $N^1$-acylated phenylhydrazine derivative of the Formula II, and reacting the resultant $N^1$-acylated phenylhydrazine derivative (II) with an aliphatic acid compound of the Formula III to yield the 1-acyl-3-indolyl aliphatic acid derivative (I).

Still further, the present invention provides a process for producing novel 1-acyl-3-indolyl aliphatic acid derivatives of the Formula I, which comprises reacting a phenylhydrazine derivative of the Formula XI:

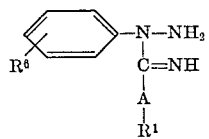

(XI)

wherein $R^1$, $R^6$ and A have the same meaning as identified in the Formula I, with an aliphatic acid derivative (III).

Still further, the present invention provides a process for preparing novel 1-acyl-3-indolyl aliphatic acid derivatives represented by the formula:

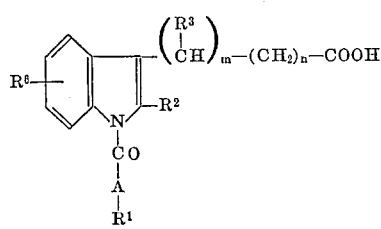

(XII)

wherein $R^1$, $R^2$, $R^3$, $R^6$, A, $m$ and $n$ have the same meanings as identified in the Formula I, which comprises converting a derivative represented by the formula:

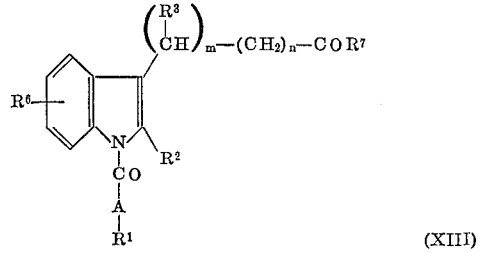

(XIII)

wherein $R^1$, $R^2$, $R^3$, $R^6$, A, $m$ and $n$ have the same meanings as identified above; and $R^7$ represents tertiary butyloxy, tetrahydropyranyloxy, benzyloxy or amino, into the said 1-acyl-3-indolyl aliphatic acid derivative (XII).

Still further, the present invention provides a process for producing novel 1-acyl-3-indolyl aliphatic acid derivatives of the Formula XII, which comprises reacting an $N^1$-acylated phenylhydrazine derivative of the Formula II with a compound of the formula:

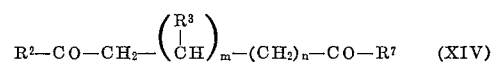

(XIV)

wherein $R^2$, $R^3$, $m$ and $n$ have the same meanings as identified above and $R^7$ represents a tertiary butyloxy group, a benzyloxy group, a tetrahydropyranyloxy group or an amino group, to yield a 1-acyl-3-indolyl aliphatic acid derivative of the Formula XIII, and decomposing the resultant 1-acyl-3-indolyl aliphatic acid derivative of the Formula XIII to yield an 1-acyl-3-indolyl aliphatic acid derivative (XII).

Still further, the present invention provides a process for preparing novel 1-acyl-3-indolyl aliphatic acid derivatives represented by the formula:

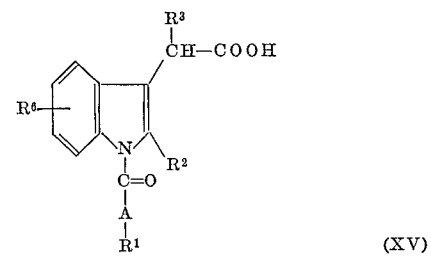

(XV)

wherein $R^1$, $R^2$, $R^3$, $R^6$ and A have the same meanings as identified above, which comprises oxidizing an indole-3-aliphatic aldehyde derivative represented by the formula:

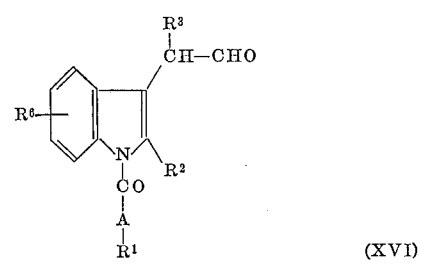

(XVI)

wherein $R^1$, $R^2$, $R^3$, $R^6$ and A have the same meanings as identified above.

Still further, the present invention provides a process for producing novel 1-acyl-3-indolyl aliphatic acid derivatives of the Formula XV, which comprises reacting an $N^1$-acylated phenylhydrazine derivative of the Formula II with a compound of the formula:

(XVII)

wherein $R^2$ and $R^3$ have the same meanings as identified above and $R^8$ is a lower alkyl group, to yield a 3-indolyl aliphatic aldehyde acetal derivative of the formula:

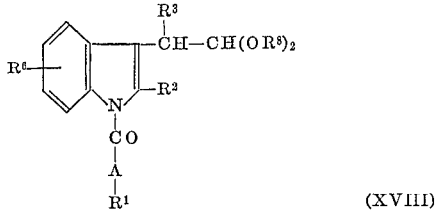

(XVIII)

wherein $R^1$, $R^2$, $R^3$, $R^6$, $R^8$ and A have the same meanings as identified above, decomposing the resultant 3-indolyl aliphatic aldehyde acetal derivative to yield a 3-indolyl aliphatic aldehyde derivative of the Formula XVI, and oxidizing the resultant 3-indolyl aliphatic aldehyde derivative to yield the 1-acyl-3-indolyl aliphatic acid derivative (XV).

Still further, the present invention provides a process for preparing novel 1-acyl-3-indolyl aliphatic acid derivatives of the formula:

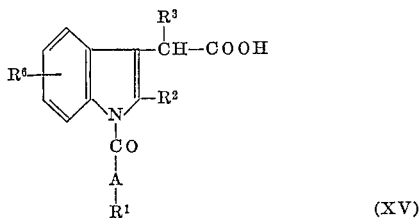

(XV)

wherein $R^1$, $R^2$, $R^3$, $R^6$ and A have the same meanings as identified above, which comprises oxidizing an indole-3-ethanol of the formula:

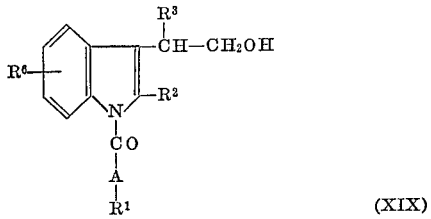

(XIX)

wherein $R^1$, $R^2$, $R^3$, $R^6$ and A have the same meanings as identified above, to yield an 1-acyl-3-indolyl aliphatic acid derivative of the Formula XV.

Still further, the present invention provides a process for producing novel 1-acyl-3-indolyl aliphatic acid derivatives of the Formula XV which comprises reacting an $N^1$-acylated phenylhydrazine derivative of the Formula II with a compound of the formula:

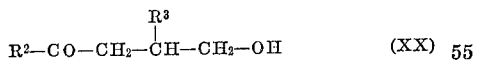

(XX)

wherein $R^2$ and $R^3$ have the same meanings as identified above, to yield a 1-acyl-3-indolyl aliphatic alcohol derivative of the Formula XIX and oxidizing the resultant 1-acyl-3-indolyl aliphatic alcohol derivative (XIX) to yield the 1-acyl-3-indolyl aliphatic acid derivative (XV).

Still further, the present invention provides a process for preparing novel 1-acyl-3-indolyl aliphatic acid derivatives of the Formula XV which comprises dehydrogenating a 2,3-dihydro-3-indolyl aliphatic acid derivative of the formula:

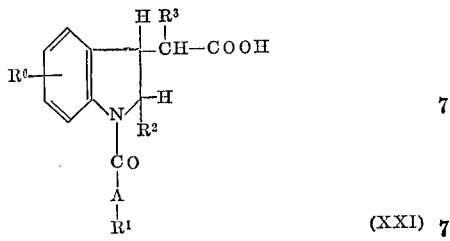

(XXI)

wherein $R^1$, $R^2$, $R^3$, $R^6$ and A have the same meanings as identified above.

Still further, the present invention provides a process for preparing novel 1-acyl-3-indolylacetic acid derivatives of the formula:

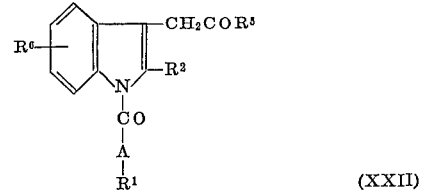

(XXII)

wherein $R^1$, $R^2$, $R^5$, $R^6$ and A have the same meanings as identified above, which comprises dehydrating or dehydrating and hydrolyzing thereafter a 2-hydro-3-hydroxy-3-indolylacetic acid derivatives of the formula:

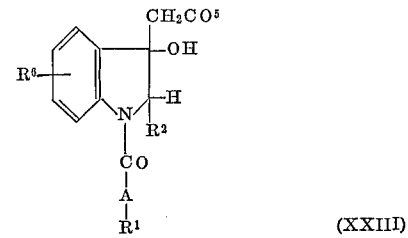

(XXIII)

wherein $R^1$, $R^2$, $R^5$, $R^6$ and A have the same meanings as identified above.

Still further, the present invention provides a process for preparing novel 1-acyl-3-indolyl aliphatic acid derivatives of the Formula XV which comprises subjecting α(N-acylanilino)-aliphatic acid derivatives of the formula:

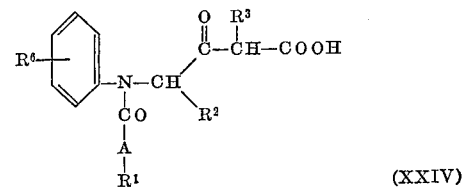

(XXIV)

wherein $R^1$, $R^2$, $R^3$, $R^6$ and A have the same meanings as identified above, to ring formation reaction.

Still further, the present invention provides a process for preparing novel 1-acyl-3-indolylacetic acid derivatives of the Formula IX, which comprises heating a 3-(2'-acylaminophenyl)-levulinic acid derivative of the formula:

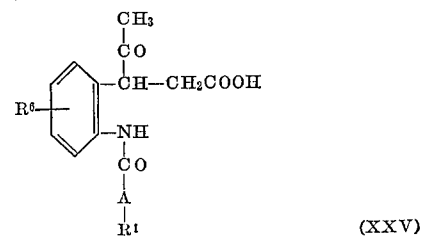

(XXV)

wherein $R^1$, $R^6$ and A have the same meanings as identified above, in the presence of an inorganic acid in a suitable solvent.

According to the present invention, a 1-acyl-3-indolyl aliphatic acid derivative represented by the Formula I is prepared by the reactions shown by the following equations:

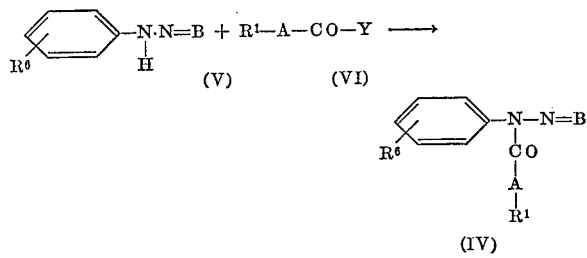

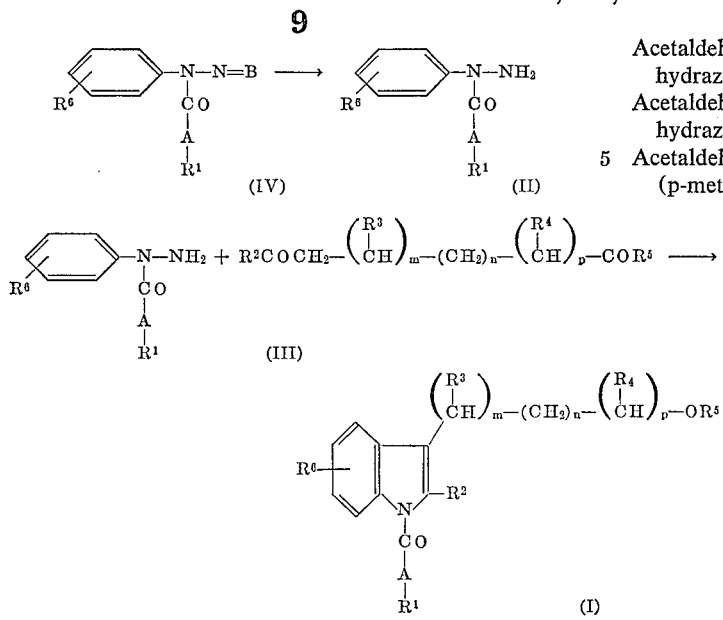

In the above formulas, $R^1$, $R^2$, $R^3$, $R^4$, $R^5$, $R^6$, A, B, Y, m, n and p have the same meanings as identified above.

In the processes of the present invention $N^1$-acylated phenylhydrazine derivatives (II) and $N^1$-acylated phenylhydrazone derivatives (IV) may be synthesized as intermediates by other processes than those disclosed herein. These intermediates, the compounds (II) and (IV), are novel compounds.

Next, the process of the present invention is explained in due order as follows.

Firstly, the reaction of a phenylhydrazone derivative (V) and a compound (VI) will be described.

The reaction of a phenylhydrazone derivative (V) with a compound (VI) is carried out in the presence of a hydrogen halide acceptor. As the hydrogen halide acceptor, a tertiary amine, for example, pyridine or dimethylaniline can be used. These hydrogen halide acceptors themselves can be used as solvents. Inert solvents such as ether, benzene, toluene, and tetrahydrofuran are also able to be used as reaction solvents in the presence of equimolar or larger amounts of these hydrogen halide acceptors. The compound (VI), may be chloride, bromide, iodide or fluoride and chloride is most preferable from a commercial point of view. The reaction proceeds at room temperature in many cases, and even below 0° C. in some kind of solvent used. The exothermic reaction finishes in a few minutes or several hours. After the reaction finishes, the produced hydrogen halide salt of the hydrogen halide acceptor is filtered off and the filtrate is concentrated under a reduced pressure, or the reaction mixture is poured into water when a water-soluble solvent like pyridine is used as the solvent. And then the aimed $N^1$-acylated phenylhydrazone compound is easily obtained as crystals or an oily substance. These products can be purified with an appropriate solvent, for example, the solvent mixture of alcohol and water.

In case a compound having a comparatively weak —N=C< bonding is used as a derivative (V) or under severe conditions of reaction, an $N^1$-acylated phenylhydrazine derivative (II) is directly obtained in place of an $N^1$-acylated phenylhydrazone derivative (IV).

According to the method of the present invention, the following compounds can be obtained in a high yield. As the $N^1$-acylated phenylhydrazone compounds (IV), there are illustrated:

Acetaldehyde $N^1$-cinnamoyl-$N^1$-(p-methoxyphenyl) hydrazone
Acetaldehyde $N^1$-cinamoyl-$N^1$-(p-methylphenyl) hydrazone
Acetaldehyde $N^1$-cinnamoyl-$N^1$-(p-chlorophenyl) hydrazone
Acetaldehyde $N^1$-cinnamoyl-$N^1$-(p-methylthiophenyl) hydrazone
Acetaldehyde $N^1$-cinnamoyl-$N^1$-(p-ethoxyphenyl) hydrazone
Acetaldehyde $N^1$-(5'-phenyl-2',4'-pentadienoyl)-$N^1$-(p-methoxyphenyl)hydrazone
Acetaldehyde $N^1$-(5'-phenyl-2',4'-pentadienoyl)-$N^1$-(p-ethoxyphenyl)hydrazone
Acetaldehyde $N^1$-cinnamoyl-$N^1$-(m-methoxyphenyl) hydrazone
Acetaldehyde $N^1$-cinnamoyl-$N^1$-(m-tolyl)hydrazone
Acetaldehyde $N^1$-(4'-phenyl-3'-butenoyl)-$N^1$-(p-methoxyphenyl)hydrazone
Benzaldehyde $N^1$-cinnamoyl-$N^1$-(p-methoxyphenyl) hydrazone
Chloral $N^1$-cinnamoyl-$N^1$-(p-methoxyphenyl)hydrazone
Acetophenone $N^1$-cinnamoyl-$N^1$-(p-methoxyphenyl) hydrazone
Acetaldehyde $N^1$-(β-2'-furylacryloyl)-$N^1$-(p-methoxyphenyl)hydrazone
Acetaldehyde $N^1$-(β-2'-furylacryloyl)-$N^1$-(p-methylphenyl)hydrazone
Acetaldehyde $N^1$-(β-2'-furylacryloyl)-$N^1$-(p-chlorophenyl)hydrazone
Acetaldehyde $N^1$-(β-2'-furylacryloyl)-$N^1$-(p-methylthiophenyl)hydrazone
Acetaldehyde $N^1$-(β-2'-furylacryloyl)-$N^1$-(p-ethoxyphenyl)hydrazone
Acetaldehyde $N^1$-(α-naphthylacryloyl)-$N^1$-(p-methoxyphenyl)hydrazone
Acetaldehyde $N^1$-(α-naphthylacryloyl)-$N^1$-(p-ethoxyphenyl)hydrazone
Acetaldehyde $N^1$-(β-2'-thienylacryloyl)-$N^1$-(m-methoxyphenyl)hydrazone
Acetaldehyde $N^1$-(β-2'-thienylacryloyl)-$N^1$-(m-tolyl) hydrazone
Acetaldehyde $N^1$-(β-2'-pyridylacryloyl)-$N^1$-(p-methoxyphenyl)hydrazone
Benzaldehyde $N^1$-(β-2'-thienylacryloyl)-$N^1$-(p-methoxyphenyl)hydrazone
Chloral $N^1$-(β-2'-thienylacryloyl)-$N^1$-(p-methoxyphenyl)hydrazone
Acetophenone $N^1$-(β-2'-thienylacryloyl)-$N^1$-(p-methoxyphenyl)hydrazone
Acetaldehyde $N^1$-(m-nitrocinnamoyl)-$N^1$-(p-methoxyphenyl)hydrazone
Acetaldehyde $N^1$-(m-nitrocinnamoyl)-$N^1$-(p-methylphenyl)hydrazone
Acetaldehyde $N^1$-(m-nitrocinnamoyl)-$N^1$-(p-chlorophenyl)hydrazone
Acetaldehyde $N^1$-(m-nitrocinnamoyl)-$N^1$-(p-methylthiophenyl)hydrazone
Acetaldehyde $N^1$-(m-nitrocinnamoyl)-$N^1$-(p-ethoxyphenyl)hydrazone
Acetaldehyde $N^1$-(p-methoxycinnamoyl)-$N^1$-(p-methoxyphenyl)hydrazone
Benzaldehyde $N^1$-cinnamoyl-$N^1$-(p-methoxyphenyl) hydrazone Chloral N¹-(p-methoxycinnamoyl)-N¹-(p-methoxyphenyl)hydrazone
Acetophenone N¹-(p-methoxycinnamoyl)-N¹-(p-methoxyphenyl)hydrazone
Acetaldehyde N¹-(5'-p-chlorophenyl-2',4'-pentadienoyl)-N¹-(p-methoxyphenyl)hydrazone
Acetaldehyde N¹-(α-phenyl-p-chlorocinnamoyl)-N¹-p-methoxyphenyl)hydrazone
Acetaldehyde N¹-(β-p-tolylacryloyl)-N¹-(p-methoxyphenyl)hydrazone
Acetaldehyde N¹-(α-methyl-p-chlorocinnamoyl)-N¹-(p-methoxyphenyl)hydrazone
Acetaldehyde N¹-(p-chlorocinnamoyl)-N¹-(p-methoxyphenyl)hydrazone
Acetaldehyde N¹-(p-methylthiocinnamoyl)-N¹-(p-methoxyphenyl)hydrazone
Acetaldehyde N¹-(p-chlorocinnamoyl)-N¹-(p-methoxyphenyl)hydrazone
Acetaldehyde N¹-(phenylacetyl)-N¹-(p-methoxyphenyl)hydrazone
Acetaldehyde N¹-(p-tolylacetyl)-N¹-(p-methoxyphenyl)hydrazone
Acetaldehyde N¹-(phenylacetyl)-N¹-(p-methylphenyl)hydrazone
Acetaldehyde N¹-(5-phenyl-n-pentanoyl)-N¹(p-methoxyphenyl)hydrazone
Acetaldehyde N¹-(phenylacetyl)-N¹-(m-chlorophenyl)hydrazone
Acetaldehyde N¹(phenylacetyl)-N¹-(p-chlorophenyl)hydrazone
Acetaldehyde N¹-(phenylacetyl)N¹-(p-methylthiophenyl)hydrazone
Acetaldehyde N¹-(p-chlorobenzylacetyl)N¹-(p-methoxyphenyl)hydrazone
Acetaldehyde N¹-(p-methylphenylacetyl)-N¹-(m-methoxyphenyl)hydrazone
Acetaldehyde N¹-(p-methoxyphenylacetyl)-N¹-(p-methoxyphenyl)hydrazone
Acetaldehyde N¹-(α-phenyl-n-butyroyl)-N¹-(p-methoxyphenyl)hydrazone
Actaldehyde N¹-(3'-pyridylacetyl)-N¹-(p-methoxyphenyl)hydrazone
Acetaldehyde N¹-(2'-pyridylacetyl)-N¹-(p-methoxyphenyl)hydrazone
Acetaldehyde N¹-(4'-pyridylacetyl)-N¹-(p-methoxyphenyl)hydrazone
Acetaldehyde N¹-(2'-thienylacetyl)-N¹-(p-methoxyphenyl)hydrazone
Acetaldehyde N¹-(2'-furylacetyl)-N¹-(p-methoxyphenyl)hydrazone
Acetaldehyde N¹-(diphenylacetyl)-N¹-(p-methoxyphenyl)hydrazone
Acetaldehyde N¹-(phenylacetyl)-N¹-(m-methoxyphenyl)hydrazone
Acetaldehyde N¹-(phenylacetyl)-N¹-(m-methylphenyl)hydrazone
Acetaldehyde N¹-(β-phenylpropionyl)-N¹-(p-chlorophenyl)hydrazone
Benzaldehyde N¹-(phenylacetate)-N¹-(p-methoxyphenyl)hydrazone
Chloral N¹-(phenylacetyl)-N¹-(p-methoxyphenyl)hydrazone
Methylethylketone N¹-(p-phenylacetyl)-N¹-(p-methoxyphenyl)hydrazone
Acetophenone N¹-(phenylacetyl)-N¹-(p-methoxyphenyl)hydrazone The following N¹-acylated hydrazine derivatives can be very easily obtained directly from hydrazone derivative of ethyl levulinate, ethyl acetoacetate, methyl 4-methoxy-3-oxo-n-butyrate, etc., under some conditions of the reaction:

N¹-cinnamoyl-N¹-(p-methoxyphenyl)hydrazine
N¹-cinnamoyl-N¹-(p-tolyl)hydrazine
N¹-cinnamoyl-N¹-(m-methoxyphenyl)hydrazine
N¹-(m-nitrocinnamoyl)-N¹-(p-methoxyphenyl)hydrazine
N¹-(phenylacetyl)-N¹-(p-methoxyphenyl)hydrazine
N¹-(p-tolylacetyl)-N¹-(p-methoxyphenyl) hydrazine
N¹-(2'-furylacetyl)-N¹-(p-methoxyphenyl)hydrazine Those novel N¹-acylated phenylhydrazone derivatives and N¹-acylated phenylhydrazine derivatives which are obtained by the method of the present invention have psychic, stimulating, anti-tumor, bactericidal, and fungicidal effects and they are very important compounds as intermediates for producing remarkably effective anti-inflammatory drugs, analgesics and anti-pyretics.

Next, the process for producing an N¹-acylated phenylhydrazine derivative (II) by decomposing an N¹-acylated phenylhydrazone derivative (IV) will be described.

An N¹-acylated phenylhydrazone derivative (IV) is dissolved or suspended in an adequate solvent, for example, alcohol, ether, benzene or toluene. When alcohol is used, absolute alcohol achieves the good yield. Then, more than equivalent of dry hydrogen chloride gas is absorbed into the resultant solution or the suspension. Then the HCl salt of the N¹-acylated phenyl-hydrazine derivative (II) precipitates as crystals in good yield. Sulfuric acid or others can be used in place of gaseous hydrogen chloride. When ether, benzene or toluene is used as the solvent, a small quantity of alcohol should be added to it. The reaction temperature is preferably 0°–25° C. though may be below 0° C.

As the N¹-acylated phenylhydrazone derivative (IV), various compounds can be illustrated. For example, the hydrazones of acetaldehye, chloral, benzaldehyde, acetal, ethyl acetoacetate and methoxy acetone can be easily decomposed in general cases to give the aimed N¹-acylated phenylhydrazine derivative (II). Among them, the hydrazone of acetaldehyde has especially distinctive commercial advantages.

According to the present invention, the following N¹-acylated phenylhydrazine derivatives (II), for example, can be obtained:

N¹-cinnamoyl-N¹-(p-methoxyphenyl)hydrazine
N¹-cinnamoyl-N¹-(p-methylphenyl)hydrazine
N¹-cinnamoyl-N¹-(p-chlorophenyl)hydrazine
N¹-cinnamoyl-N¹-(p-methylthiophenyl)hydrazine
N¹-cinnamoyl-N¹-(p-ethoxyphenyl)hydrazine
N¹-(5'-phenyl-2',4'-pentadienoyl)-N¹-(p-methoxyphenyl) hydrazine
N¹-(5'-phenyl-2',4'-pentadienoyl)-N¹-(p-ethoxyphenyl) hydrazine
N¹-cinnamoyl-N¹-(p-methoxyphenyl)hydrazine
N¹-cinnamoyl-N¹-(p-methylphenyl)hydrazine
N¹-(4'-phenyl-3'-butenoyl)-N¹-(p-methoxyphenyl) hydrazine
N¹-(m-nitrocinnamoyl)-N¹-(m-methoxyphenyl)hydrazine
N¹-(m-nitrocinnamoyl)-N¹-(p-methylphenyl)hydrazine
N¹-(m-nitrocinnamoyl)-N¹-(p-chlorophenyl)hydrazine
N¹-(m-nitrocinnamoyl)-N¹-(p-methylthiophenyl) hydrazine
N¹-(m-nitrocinnamoyl)-N¹-(p-ethoxyphenyl)hydrazine
N¹-(methylthiocinnamoyl)-N¹-(p-methoxyphenyl) hydrazine
N¹-(p-methoxycinnamoyl)-N¹-(p-methoxyphenyl) hydrazine
N¹-(p-chlorocinnamoyl)-N¹-(p-methoxyphenyl)hydrazine
N¹-{5'-(p-chlorophenyl)-2',4'-pentadienoyl}-N¹-(p-methoxyphenyl)hydrazine
N¹-(α-phenyl-p-chlorocinnamoyl)-N¹-(p-methoxyphenyl) hydrazine
N¹-(β-p-tolylacryloyl)-N¹-(p-methoxyphenyl)hydrazine
N¹-(α-methyl-p-chlorocinnamoyl)-N¹-(p-methoxyphenyl) hydrazine
N¹-(p-chlorocinnamoyl-N¹-(m-methoxyphenyl)hydrazine
N¹-phenylacetyl-N¹-(p-methoxyphenyl)hydrazine
N¹-phenylacetyl-N¹-(p-chlorophenyl)hydrazine
N¹-phenylacetyl-N¹-(p-methylthiophenyl)hydrazine
N¹-phenylacetyl-N¹-(p-ethoxyphenyl)hydrazine N¹-(p-methylphenylacetyl)-N¹-(p-methoxyphenyl) hydrazine
N¹-phenylacetyl-N¹-phenylhydrazine
N¹-(3'-pyridylacetyl)-N¹-(p-methoxyphenyl)hydrazine
N¹-(4'-pyridylacetyl)-N¹-(p-methoxyphenyl)hydrazine
N¹-(2'-pyridylacetyl)-N¹-(p-methoxyphenyl)hydrazine
N¹-(2'-thienylacetyl)-N¹-(p-methoxyphenyl)hydrazine
N¹-(2'-furylacetyl)-N¹-(p-methoxyphenyl)hydrazine
N¹-(5'-chloro-2'-thienylacetyl)-N¹-(p-methoxyphenyl) hydrazine
N¹-(diphenylacetyl)-N¹-(p-methoxyphenyl)hydrazine
N¹-(2-phenyl-n-butyroyl)-N¹-(p-methoxyphenyl) hydrazine
N¹-(α-naphthylacetyl)-N¹-(p-methoxyphenyl)hydrazine
N¹-(β-naphthylacetyl)-N¹-(p-methoxyphenyl)hydrazine
N¹-(m,p-dimethoxyphenylacetyl)-N¹-(p-methoxyphenyl) hydrazine
N¹-(4'-p-methoxyphenyl-n-butyroyl)-N¹-(p-methoxyphenyl)hydrazine
N¹-(5'phenyl-n-pentaoyl)-N¹-(p-methoxyphenyl) hydrazine
N¹-(5'-phenyl-n-pentanoyl)-N¹-(p-ethoxyphenyl) hydrazi
N¹-phenylacetyl-N¹-(m-methoxyphenyl)hydrazine
N¹-phenylacetyl-N¹-(m-methylphenyl)hydrazine
N¹-(4'-phenyl-n-butyroyl)-N¹-(p-methoxyphenyl) hydrazine
N¹-(β-2'-thienylacryloyl)-N¹-(p-methoxyphenyl) hydrazine
N¹-β-2'-thienylacryloyl)-N¹-(p-methylphenyl)hydrazine
N¹-(β-2'-thienylacryloyl)-N¹-(p-chlorophenyl)hydrazine
N¹-(β-2'-thienylacryloyl)-N¹-(p-methylthiophenyl) hydrazine
N¹-(β-2'-thienylacryloyl)-N¹-(p-ethoxyphenyl)hydrazine
N¹-(β-2'-thienylacryloyl)-N¹-(m-methoxyphenyl) hydrazine
N¹-(β-2'-furylacryloyl)N¹-(p-ethoxyphenyl(hydrazine
N¹-(β-2'-pyridylacryloyl)-N¹-(m-methoxyphenyl) hydrazine
N¹-(β-2'-pyridylacryloyl)-N¹-(m-methylphenyl)hydrazine
N¹-(β-2'-furylacryloyl)-N¹-(p-methoxyphenyl)hydrazine
N¹-{β-(α'-naphthyl)-acryloyl}-N¹-(p-methoxyphenyl) hydrazine Their salts, for example, hydrochlorides, sulphates and phosphates, can be easily obtained. All of them are novel compounds that have not been reported in any literature.

These compounds have psychic, stimulating, anti-tumor, bactericidal and fungicidal activities and are very important as intermediates for producing strong anti-inflammatory drugs, analgesics and anti-pyretics.

In some cases the novel N¹-acylated phenylhydrazine derivatives (II) are directly obtained by reacting a phenylhydrazine derivative (X),

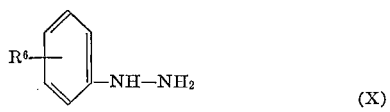
(X)

wherein R⁶ has the same meaning as identified in the Formula I, or salts thereof, with a compound (VI)

$$R^1—A—CO—Y \quad (VI)$$

wherein R¹ and A have the same meanings as identified in the Formula I and Y is a halogen atom in this case, in the presence of a basic reagent.

This reaction is carried out in a conventional solvent such as benzene, toluene, xylene, ether, dioxane or tetrahydrofuran in the presence of a dehydrogenhalide agent such as a tertiary amine. As the tertiary amine, triethyl amine, pyridine or dimethylaniline is suitable and the amount thereof is required preferably at least equal mole of the said phenylhydrazine derivative (X).

This reaction proceeds so rapidly that the compound (VI) is added slowly to a phenylhydrazine derivative (X) in a suitable solvent while cooling. The N¹-acylated phenyl-hydrazine derivative (II) thus obtained is contaminated with a by-product such as N²-acylated compound or N²,N²-diacylated compound, however the objective N¹-acylated phenyl-hydrazine derivative (II) is separated and purified by removing the by-products by a suitable method such as column chromatography. However, the purification of the N¹-acylated compound is not necessary, because only the N¹-acylated derivative is concerned with the following reaction in the present invention.

According to the process of the present invention, the compounds having the following substituents which are represented by R¹, R⁶ and A in the said Formulas II, VI and X are obtained.

R¹: phenyl, p - chlorophenyl, p - methylphenyl, p-methoxyphenyl, p-bromophenyl, p-ethylphenyl, p-ethoxyphenyl, 3-pyridyl, 4-pyridyl, 2-furyl, 3-furyl, 2-thienyl, 3-thienyl, 5-chloro-2-thienyl, N-methyl-3-pyperidyl, α-naphthyl, hydrogen atom;

A: —CH₂—, —CH₂—CH=CH—, —CH=CH—, —CH=CH—CH=CH—, —CH₂—CH₂—CH₂—CH₂—,

—CH₂—CH=CH—CH₂— and —CH₂—CH=CH₂.

R⁶: chlorine, bromine, fluorine, hydrogen, methyl, ethyl, isopropyl, methoxy, ethoxy, propioxy, methylthio, ethylthio and isopropylthio.

Lastly the process for producting a 1-acyl-3-indolyl aliphatic acid derivative (I) by the reaction of an N¹-acylated phenylhydrazine derivative (II) with an aliphatic acid derivative (III) will be described.

The reaction is carried out on heating in the presence of an adequate condensing agent or not in an organic solvent or not. The yield is very high.

This reaction is carried out on heating in the presence solvent but it is preferable to use a suitable solvent in many cases. As the solvent, organic acids, for example acetic acid, formic acid, propionic acid, lactic acid, butyric acid, non-polar organic solvents, for example cyclohexane, n-hexane, benzene, toluene, and other organic solvents, such as dioxane and dimethyl formamide are used in the ring formation reaction. When an alcohol is used as a solvent in this reaction, a corresponding ester of indole aliphatic acid is produced. For example,

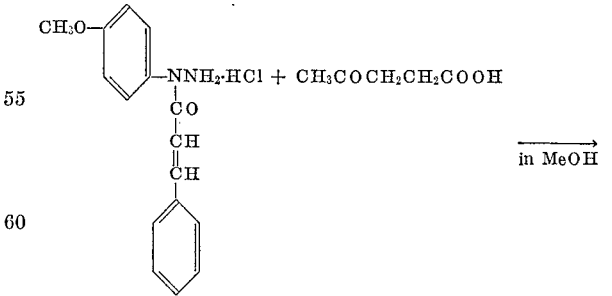

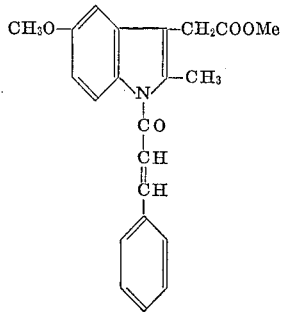

A 5-substituted indole derivative can be prepared by ring formation reaction of a para-substituted phenyl hydrazine derivative, but in the case of meta-substituted phenylhydrazine derivative two isomers, 4- and 6-substituted indole derivatives can be obtained.

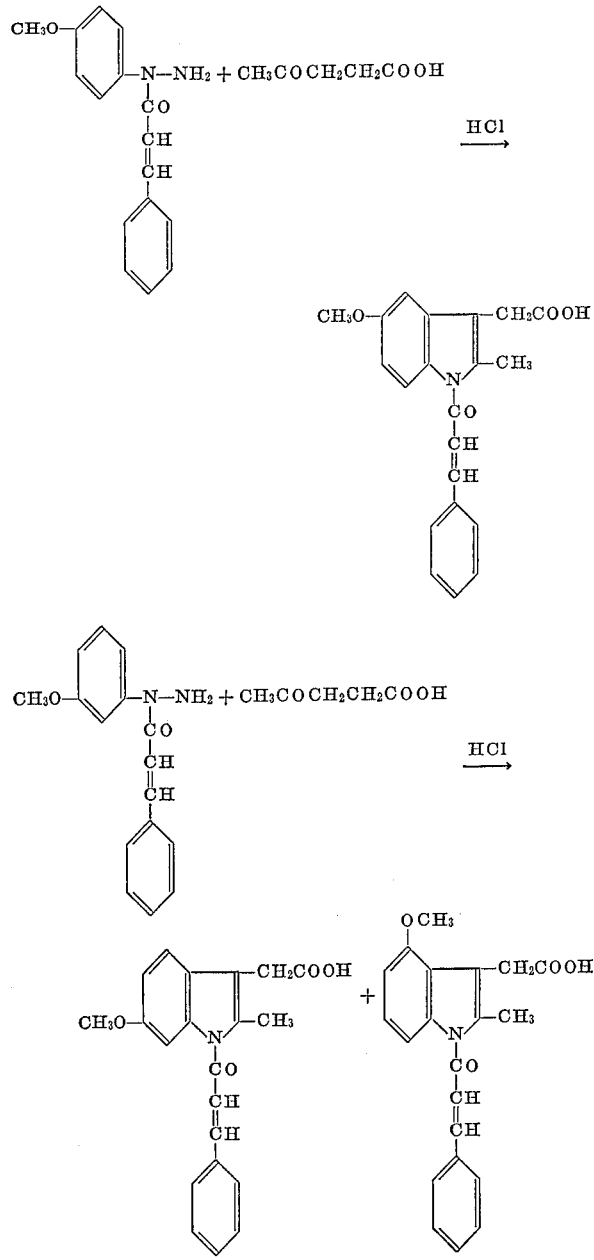

These isomers can be generally separated by column chromatography.

At a temperature within a range of 50° to 200° C., the reaction generally proceeds but a temperature within a range of 65° to 95° C. is preferable. The reaction proceeds rapidly and is generally finished in a short period of reaction time, mostly in one or two hours. The condensing agent is not needed in some cases but desirable results are generally achieved by using a condensing agent. The condensing agent includes inorganic acids such as hydrochloric acid, sulfuric acid and phosphoric acid, metal halides such as zinc chloride and copper chloride, heavy metal powder such as copper powder, Grignard's reagents, boron fluorides, polyphosphoric acid or ion-exchange resins. Hydrochloric acid or the like is required in an equimolar or larger amount, while copper powder or the like may be in a small amount.

In after treatment, the reaction mixture is allowed to stand at room temperature or in a refrigerator (about 5° C.), and then a large amount of crystals of the product is mostly obtained.

When crystals do not produce, the reaction mixture is concentrated under reduced pressure, or water, acetic acid-water or petroleum ether is adequately added to the mixture. And then, the beautiful crystals can be obtained. Ether, acetone, acetone-water, alcohol, alcohol-water, benzene and acetic acid are generally preferred as a solvent for recrystallizing the present compound. Polymorphic crystals are often given in these compounds, and their crystal system varies with kind of a recrystallizing solvent and crystallizing velocity. The produced crystals are collected by filtration and they are generally washed with an aqueous solution of acetic acid, alcohol-water, water or petroleum ether before they are dried. Objective products are generally crystalline, but oily products are sometimes given in ester compounds.

Reaction solvents, reaction conditions, condensing agents and recrystallization solvents which have been mentioned above are only presented as illustrative of the present invention but not in its limitation, needless to speak of.

The following compounds are easily obtained in good yield, theoretically or in nearly theoretically, according to the process of the present invention:

1-cinnamoyl-2-methyl-5-methoxy-3-indolylacetic acid
1-cinnamoyl-5-methoxy-3-indolylacetic acid
1-cinnamoyl-2,5-dimethyl-3-indolylacetic acid
1-cinnamoyl-2-methyl-5-chloro-3-indolylacetic acid
1-cinnamoyl-2-methyl-3-indolylacetic acid
1-cinnamoyl-2-methyl-5-methylthio-3-indolylacetic acid
1-cinnamoyl-2-methyl-5-ethoxy-3-idolylacetic acid
Dimethyl 1-cinnamoyl-2-methyl-5-methoxy-3-indolylmalonate
1-cinnamoyl-2-methyl-5-methoxy-3-indolylacetamide
t-Butyl-1-cinnamoyl-2-methyl-5-methoxy-3-indolylacetate
Ethyl 1-cinnamoyl-2-methyl-5-methoxy-3-indolylacetate
Methyl 1-cinnamoyl-2-methyl-5-methoxy-3-indolylacetate
Benzyl 1-cinnamoyl-2-methyl-5-methoxy-3-indolylacetate
Tetrahydropiranyl 1-cinnamoyl-2-methyl-5-methoxy-3-indolylacetate
γ-(1-cinnamoyl-2-methyl-5-methoxy-3-indolyl)butyric acid
α-(1-cinnamoyl-2-methyl-5-methyl-3-indolyl)propionic acid
β-(1-cinnamoyl-2-methyl-5-methoxy-3-indolyl)propionic acid
γ-(1-cinnamoyl-2-methyl-5-methyl-3-indolyl)propionic acid
A mixture of 1-cinnamoyl-2-methyl-4-methoxy-3-indolylacetic acid and 1-cinnamoyl-2-methyl-6-methoxy-3-indolylacetic acid
A mixture of 1-cinnamoyl-2,4-dimethyl-3-indolylacetic acid and 1-cinnamoyl-2,6-dimethyl-3-indolylacetic acid
A mixture of 1-cinnamoyl-4-methyl-3-indolylacetic acid and 1-cinnamoyl-6-methyl-3-indolylacetic acid
1-(4'-phenyl-3'-butenoyl)-2-methyl-5-methoxy-3-indolylacetic acid
α-{1-(4'-phenyl-3'-butenoyl)-2-methyl-5-methoxy-3-indolyl}propionic acid
1-(2'-α'-naphthylacryloyl)-2-methyl-5-methoxy-3-indolylacetic acid
1-(p'-nitrocinnamoyl)-2-methyl-5-methoxy-3-indolylacetic acid
1-(β'-phenylcinnamoyl)-2-methyl-5-methoxy-3-indolylacetic acid
1-(3'-phenylcrotonoyl)-2-methyl-5-methoxy-3-indolylacetic acid
1-(2'-α'-pyridylacryloyl)-2-methyl-5-methoxy-3-indolylacetic acid
1-{2'-(2''-quinolyl)-acryloyl}-2-methyl-5-methoxy-3-indolylacetic acid 1-(β'-benzylcinnamoyl)-2-methyl-5-methoxy-
    3-indolylacetic acid
1-(p'-bromocinnamoyl)-2-methyl-5-methoxy-
    3-indolylacetic acid
1-(p'-chlorocinnamoyl)-2-methyl-5-methoxy-
    3-indolylacetic acid
1-(p'-methoxycinnamoyl)-2-methyl-5-methoxy-
    3-indolylacetic acid
1-(α',β'-dibromocinnamoyl)-2-methyl-5-methoxy-
    3-indolylacetic acid
1-(3'-phenyl-3'-benzylidenebutyroyl)-2-methyl-5-methoxy-3-indolylacetic acid
1-(cinnamylidenepropionyl)-2-methyl-5-methoxy-
    3-indolylacetic acid
1-(β'-styrylacryloyl)-2-methyl-5-methoxy-
    3-indolylacetic acid
γ-{1-(β'-styrylacryloyl)-2-methyl-5-methoxy-
    3-indolyl}butyric acid
1-(β'-styrylacryloyl)-2-methyl-5-ethoxy-3-indolylacetic acid
Dimethyl 1-(phenylacetyl)-2-methyl-5-methoxy-
    3-indolylmalonate
1-(phenylacetyl)-2-methyl-5-methoxy-3-indolylacetic acid
γ-{1-(phenylacetyl)-2-methyl-5-methoxy-
    3-indolyl}butyric acid
α-1-(phenylacetyl)-2-methyl-5-methoxy-3-indolyl-
    propionic acid
1-(phenylacetyl)-2,5-dimethyl-3-indolylacetic acid
1-(phenylacetyl)-5-methoxy-3-indolylacetic acid
1-(phenylacetyl)-2-methyl-5-chloro-3-indolylacetic acid
Methyl 1-(phenylacetyl)-2-methyl-5-methoxy-3-indolylacetate
1-(phenylacetyl)-2-methyl-5-methoxy-3-indolyl-
    acetamide
Benzyl 1-(phenylacetyl)-2-methyl-5-methoxy-
    3-indolylacetate
Tetrahydropiranyl 1-(phenylacetyl)-2-methyl-
    5-methoxy-3-indolylacetate
Tertiary butyl 1-(phenylacetyl)-2-methyl-5-methoxy-
    3-indolylacetate
1-(phenylacetyl)-2-methyl-3-indolylacetic acid
1-(furylacetyl)-2-methyl-5-methoxy-3-indolylacetate
1-(2'-phenylpropionyl)-2-methyl-5-methoxy-
    3-indolylacetic acid
1-(4'-methoxyphenylacetyl)-2-methyl-5-methoxy-
    3-indolylacetic acid
1-(3',4'-dimethoxyphenylacetyl)-2-methyl-5-methoxy-
    3-indolylacetic acid Besides these compounds indole derivatives having the following groups as 1-substituent of indole ring represented by —CO—A—R¹ can be prepared by the process of the present invention in good yield.

—CO—A—R¹: p-cyanocinnamoyl, m-cyanocinnamoyl, o-iodohydrocinnamoyl, o-iodophenyl-2'-nitrocinnamoyl, 4'-chloro-3'-nitrocinnamoyl, α',β'-dichlorocinnamoyl, p'-methylcinnamoyl, 1',4'-diphenyl-1'-butylene-1'-carbonyl, 3',4'-diphenyl-1'-butylene-1'-carbonyl, 1',1'-diphenyl-1'-butylene-2'-carbonyl, 1',4'-diphenyl-1'-butylene-2'-carbonyl, 1',4'-diphenyl-1'-butylene-3'-carbonyl, 1',1'-diphenyl-1'-butylene-4'-carbonyl, 1',3'-diphenyl-1'-butylene-4'-carbonyl, 1',4'-diphenyl-2'-butylene-1'-carbonyl, 2'-β'-naphthylacryloyl, o'-nitrocinnamoyl, 3'-(p'-methoxyphenyl)-crotonoyl, 2'-(4''-quinolyl)-acryloyl, α'-benzylcinnamoyl, o'-bromocinnamoyl, m'-bromocinnamoyl, o'-chlorocinnamoyl, p'-chlorocinnamoyl, α'-chloro-2'-nitrocinnamoyl, α'-chloro-3'-nitrocinnamoyl, α'-chloro-4'-nitrocinnamoyl, β'-chloro-3'-nitrocinnamoyl,

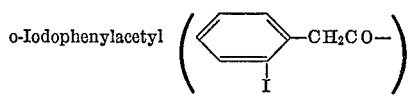

p-Isopropylhydrocinnamoyl ((CH₃)₂CH—⟨ ⟩—CH₂CH₂CO—)

o-Methoxyhydrocinnamoyl (⟨ ⟩—CH₂CH₂CO—, OCH₃)

o-Methoxyhydrocinnamoyl (⟨ ⟩—CH₂CH₂CO—, OCH₃)

p-Methoxyhydrocinnamoyl (CH₃O—⟨ ⟩—CH₂CH₂CO—)

β-Methyl-β-ethylhydrocinnamoyl (⟨ ⟩—C(CH₃)(C₂H₅)—CH₂CO—)

5'-methyl-α-furylacetyl (CH₃—furyl—CH₂CO—)

2-p-tolylpropionyl (CH₃—⟨ ⟩—CH(CH₃)—CO—)

α-Methylhydrocinnamoyl (⟨ ⟩—CH₂CH(CH₃)CO—)

β-Methylhydrocinnamoyl (⟨ ⟩—CH(CH₃)CH₂CO—)

o-Methylhydrocinnamoyl (⟨ ⟩—CH₂CH₂CO—, CH₃)

m-Methylhydrocinnamoyl (⟨ ⟩—CH₂CH₂CO—, CH₃)

p-Methylhydrocinnamoyl (CH₃—⟨ ⟩—CH₂CH₂CO—)

2-methyl-2-phenylbutyroyl (⟨ ⟩—C(CH₃)(C₂H₅)CO—)

2-methyl-3-phenylbutyroyl (⟨ ⟩—CH(CH₃)—C(CH₃)H—CO—)

2-methyl-4-phenylbutyroyl (⟨ ⟩—CH₂—CH₂—CH(CH₃)—CO—)

2-methyl-4-β-naphthylbutyroyl (naphthyl—CH₂CH₂CH(CH₃)—CO—)

2-methyl-4-α-naphthylbutyroyl [naphthyl—CH₂CH₂CH(CH₃)CO—]

α-Naphthylacetyl [naphthyl—CH₂CO—]

4,α-naphthylbutyroyl [naphthyl—CH₂CH₂CH₂CO—]

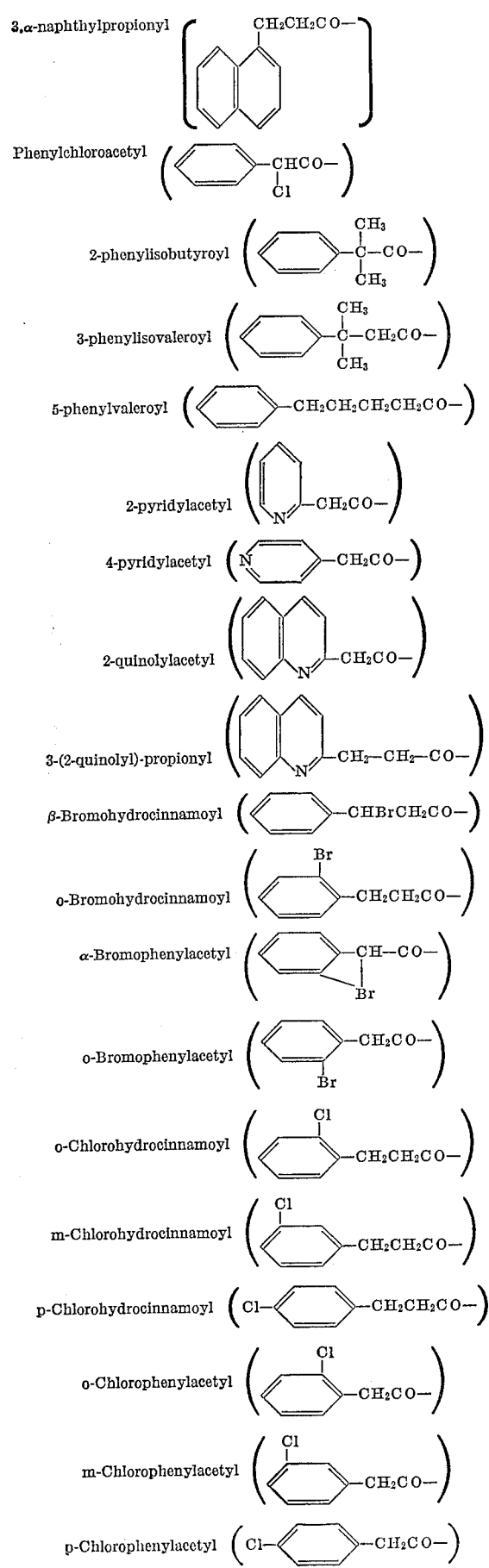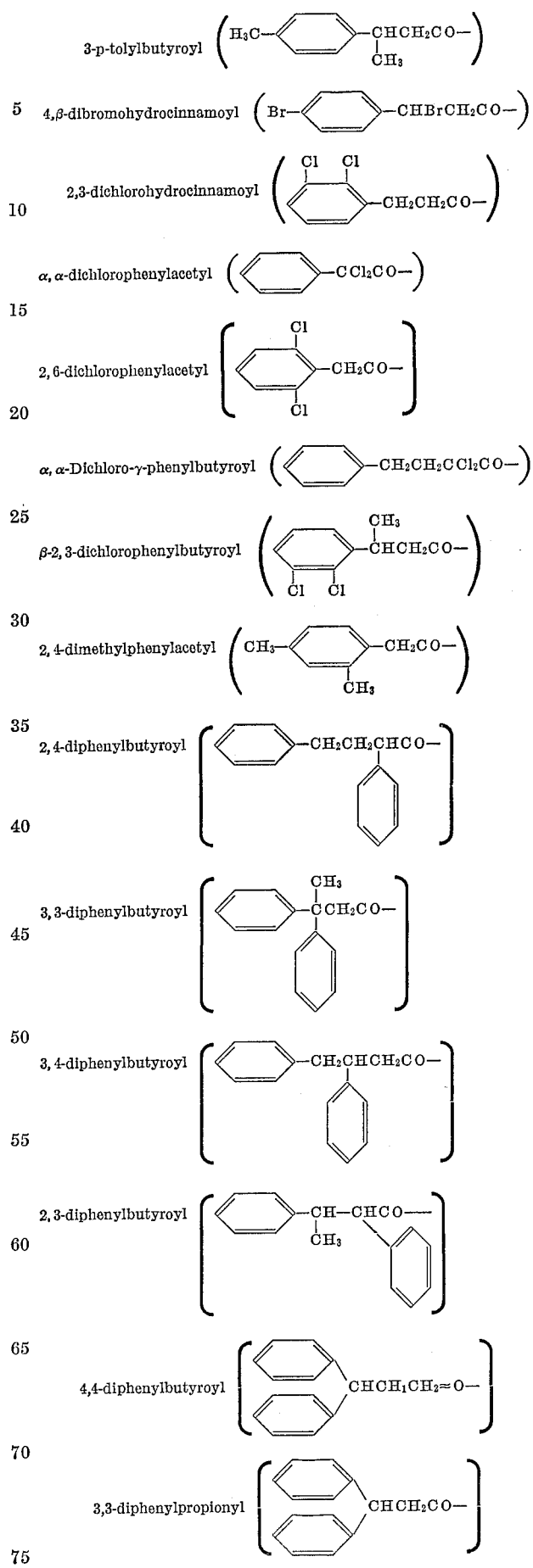

2-methyl-2-(α-naphthyl)propionyl 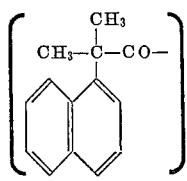

2-ethyl-2-(α-naphthyl)butyroyl 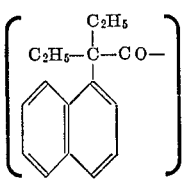

Methyl-(4-phenyl)phenyl-acetyl 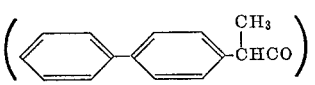

Many other 1-acyl-3-indolyl aliphatic acid derivatives can be thus synthesized.

In this method of the present invention, when the aliphatic acid derivative (VIII) of which $R^4$ is carboxy group, $n$ is 0 and $p$ is 1 in the Formula III reacts with an $N^1$-acylated phenylhydrazine derivative (II), an 1-acyl-3-indolyl aliphatic acid derivative (VII) can be obtained as follows.

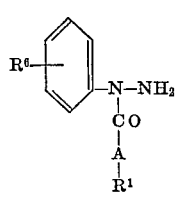 + 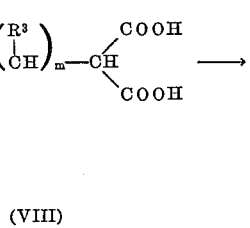 ⟶

(II)         (VIII)

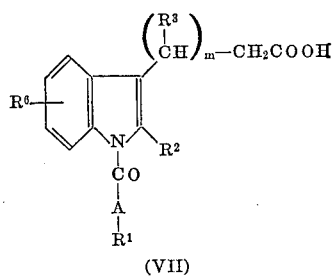

(VII)

wherein $R^1$, $R^2$, $R^3$, $R^6$, A and $m$ have the same meanings as mentioned above.

The following compounds, for example, are easily obtained in a good yield by this method.

1-phenylacetyl-2-methyl-5-methoxy-3-indolylacetic acid
1-cinnamoyl-2-methyl-5-ethoxy-3-indolylacetic acid
1-cinnamoyl-2-methyl-3-indolylacetic acid Further in some cases an 1-acyl-3-indolylacetic acid derivative of the formula,

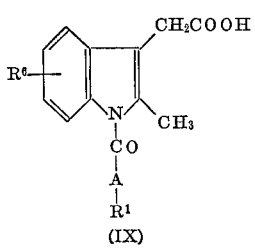

(IX)

wherein $R^1$, $R^6$ and A have the same meanings as identified in the Formula I, is prepared from an $N^1$-acyl phenylhydrazine derivative (II) or salt thereof and acetosuccinic acid or 2-ketoadipic acid.

An example of this method is shown as follows:

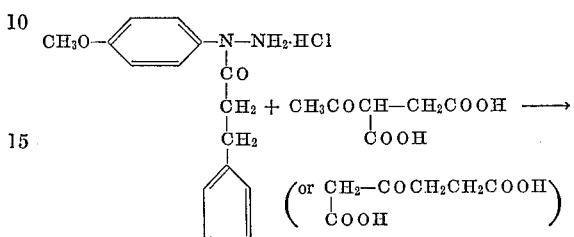

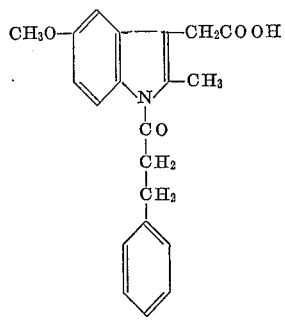

The following compounds, for example, are prepared in a good yield by this method.

1-cinnamoyl-2-methyl-5-methoxy-3-indolylacetic acid
1-(p-methoxycinnamoyl)-2-methyl-5-methoxy-3-indolyl- acetic acid
1-phenylacetyl-2-methyl-5-methoxy-3-indolylacetic acid
1-cinnamoyl-2-methyl-5-ethoxy-3-indolylacetic acid
1-cinnamoyl-2-methyl-3-indolylacetic acid
1-cinnamoyl-2-methyl-5-methoxy-3-indolylacetic acid
1-(β-2'-pyridylacryloyl)-2-methyl-5-methoxy-3-indolyl- acetic acid Further, in the process of the present invention, a 1-acyl-3-indolyl aliphatic acid derivative (I) can be obtained directly from an $N^1$-acylated hydrazone derivative (IV) in some cases, in which a 1-acyl-3-indolyl aliphatic acid derivative (I) is produced by reacting an $N^1$-acylated phenyl hydrazone derivative (IV) with an aliphatic acid derivative (III) on heating in the presence of a suitable condensing agent or not in an organic solvent or not.

According to this method, as a solvent, organic acids such as formic acid, propionic acid, lactic acid and butyric acid, non-polar organic solvents such as cyclohexane, n-hexane, benzene and toluene or an alcohol may be available.

The reaction generally proceeds at 50° to 200° C., preferably at 65° to 95° C.

In organic acids such as hydrochloric acid and sulfuric acid, metal halides such as zinc chloride and copper chloride, boron fluoride and polyphosphoric acid can be used as a condensing agent in the reaction.

The following 1-acyl-3-indolyl aliphatic acid derivatives, for example, can be prepared by the method, 1-phenylacetyl-2-methyl-5-methoxy-3-indolylacetic acid
1-cinnamoyl-2-methyl-5-methoxy-3-indolylacetic acid
Methyl 1-phenylacetyl-2-methyl-5-methoxy-3-indolyl- acetate Ethyl 1-phenylacetyl-2-methyl-5-methoxy-3-indolyl-
   acetate
Tertiary butyl 1-phenylacetyl-2-methyl-5-methoxy-3-
   indolylacetate In this case when $R^4$ is a carboxy group in the Formula III, the carboxy group is decarbonated to yield an 1-acyl-3-indolyl aliphatic acid derivative (VII), as shown below.

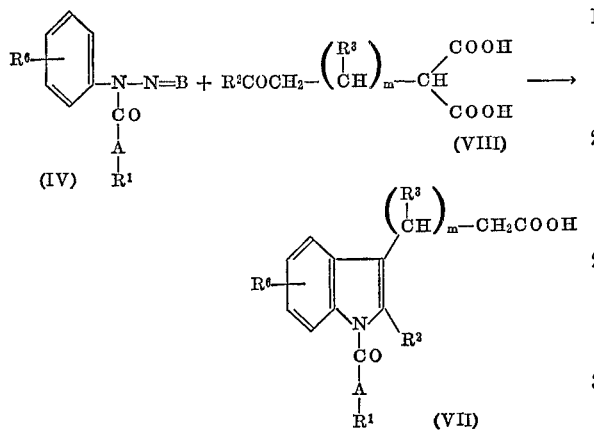

Following compounds, for example, are obtained by this method.

1-phenylacetyl-2-methyl-5-methoxy-3-indolylacetic acid
1-cinnamoyl-2-methyl-5-methoxy-3-indolylacetic acid Still further, according to the present invention a 1-acyl-3-indolyl aliphatic acid derivative represented by the Formula I is prepared from the phenylhydrazine derivative of the Formula IX or a salt thereof and an aliphatic acid derivative of the Formula III in the presence or absence of a suitable solvent, and in the presence or absence of a condensing agent.

In the reaction, suitable solvents are organic acids, such as acetic acid, formic acid, propionic acid and lactic acid, non-polar solvents such as cyclohexane, n-hexane, benzene, toluene and xylene, ether compounds such as dioxane and diisopropyl ether or other conventional organic solvents. Suitable condensing agents are inorganic acids such as hydrochloric acid, sulfuric acid, phosphoric acid and hydrogen chloride, metal halides such as zinc chloride, copper chloride, a metal powder, such as copper powder, a Grignard's reagent, a boron fluoride, polyphosphoric acid or an ion-exchanger resin. However, it is not always necessary to use a solvent or a condensing agent. This indole ring formation proceeds under heating the reaction mixture at 50° to 200° C., and is completed within several hours. Preferably, the reaction is continued at 65° to 95° C. for 1 to 4 hours.

After completion of the reaction, the reaction mixture is allowed to cool, a large amount of crystals are generally produced as precipitate. Even in the case which crystals are not produced, if the solvent is removed by distillation or water or petroleum ether is added to the reaction mixture, a large amount of crystals can be obtained. The crude crystals are collected by filtration, washed with water and thereafter recrystallized from a suitable solvent to give a pure objective product.

This process of the present invention, for example, is shown by a chemical equation as follows:

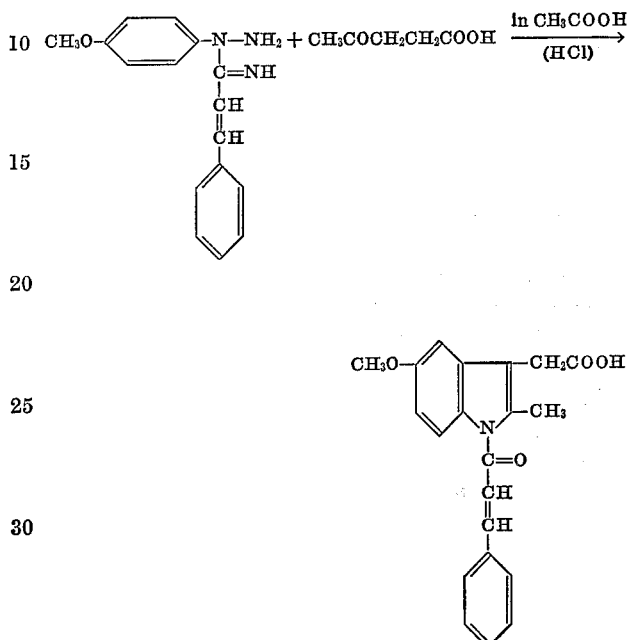

For example, 1-acyl-3-indolyl aliphatic acid derivatives which are prepared by this method are as follows, but it is not necessary to say that 1-acyl-3-indolyl aliphatic acid derivatives are not restricted only to them.

1-cinnamoyl-2-methyl-5-methoxy-3-indolylacetic acid
Benzyl 1-phenylacetyl-2-methyl-5-methoxy-3-indolylacetate
1-cinnamoyl-2-methyl-5-methoxy-3-indolylacetamide
1-cinnamoyl-5-methoxy-3-indolylacetic acid
α-(1-cinnamoyl-5-methoxy-2-methyl-3-indolyl)-propionic acid
1-(p-methylcinnamoyl)-2-methyl-5-methoxy-3-indolylacetic acid
1-(β-2-pyridylacryloyl)-2-methyl-5-methoxy-3-indolylacetic acid
1-(β-styrylacryloyl)-2-methyl-3-indolylacetic acid
1-cinnamoyl-2,5-dimethyl-3-indolylacetic acid
1-cinnamoyl-2-methyl-5-chloro-3-indolylacetic acid
1-cinnamoyl-2-methyl-4-methoxy-3-indolylacetic acid
1-cinnamoyl-2-methyl-6-methoxy-3-indolylacetic acid
1-cinnamoyl-2-methyl-5-methylthio-3-indolylacetic acid
1-cinnamoyl-2-methyl-3-indolylacetic acid
1-cinnamoyl-2-ethyl-5-methoxy-3-indolylacetic acid Still further, according to the present invention a 1-acyl-3-indolyl aliphatic acid derivative (XII) is obtained by converting an ester or amide derivative (XIII) of a corresponding 3-indolyl aliphatic acid.

For example, a benzyl ester of a 3-indolyl aliphatic acid is converted to a free 3-indoyl aliphatic acid derivative (XII) by hydrogenating with decomposition in the presence of a metal catalyst such as palladium.

This method is shown, for example, as following reaction formula:

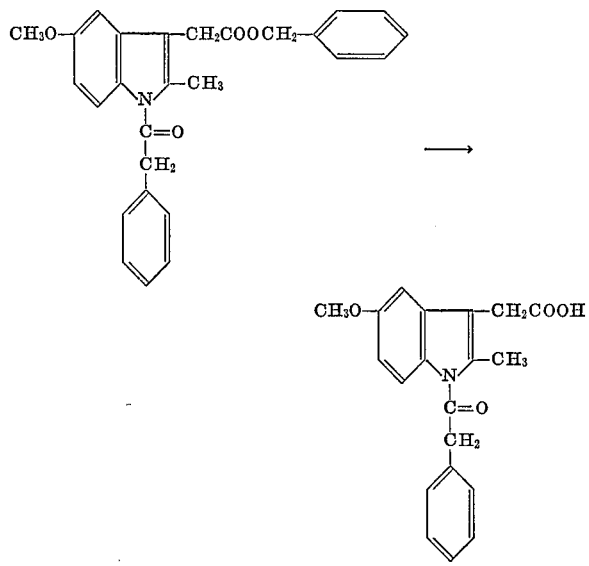

If the alcohol moiety of the ester compound (X) is tertiary butyl alcohol, the ester is treated with an arylsulfonic acid such as p-toluenesulfonic acid to yield an objective product.

If a tertiary butyl ester is only fused by heating, it is decomposed to yield an objective free 3-indolyl aliphatic acid derivative (XII).

In a few cases a free 3-indolyl aliphatic acid derivative may be obtained by treating an amide of the corresponding 3-indolyl aliphatic acid derivative with a suitable amount of nitrous acid in an inert solvent.

The following compounds, for example, are prepared by this method.

1-cinnamoyl-2-methyl-5-methoxy-3-indolylacetic acid
1-phenylacetyl-2-methyl-5-methoxy-3-indolylacetic acid
1-(p-tolylacetyl)-2-methyl-5-methoxy-3-indolylacetic acid
1-(p-isobutylphenylacetyl)-2-methyl-5-methoxy-3-indolylacetic acid
1-phenylacetyl-2-methyl-5-chloro-3-indolylacetic acid
1-phenylacetyl-2,5-dimethyl-3-indolylacetic acid
1-phenylacetyl-2-methyl-5-methylthio-3-indolylacetic acid
β-(1-phenylacetyl-2-methyl-5-methoxy-3-indolyl)propionic acid
α-(1-phenylacetyl-2-methyl-5-methoxy-3-indolyl)propionic acid
1-(m-chlorophenylacetyl)-2-methyl-5-methoxy-3-indolylacetic acid
1-phenylacetyl-5-methoxy-3-indolylacetic acid
1-phenylacetyl-2-methyl-4-methoxy-3-indolylacetic acid
1-phenylacetyl-2-methyl-6-methoxy-3-indolylacetic acid
1-(α-naphthylacetyl)-2-methyl-5-methoxy-3-indolylacetic acid
1-{β-2'-furyl)-acryloyl}-2-methyl-5-methoxy-3-indolylacetic acid
1-(2'-thienylacetyl)-2-methyl-5-methoxy-3-indolylacetic acid
1-{2'-(α-pyridyl)-acrylol}-2-methyl-5-methoxy-3-indolylacetic acid
1-(2'-phenylbutyroyl)-2-methyl-5-methoxy-3-indolylacetic acid
1-(2'-phenylbutyroyl)-2,5-dimethyl-3-indolylacetic acid
1-(3'-phenylpropionoyl)-2-methyl-5-methoxy-3-indolylacetic acid
1-(3'-phenylpropionoyl)-2-methyl-5-chloro-3-indolylacetic acid
1-pivaloyl-2-methyl-5-methoxy-3-indolylacetic acid Still further, according to the present invention, a 1-acyl-3-indolyl aliphatic acid derivative represented by the Formula XV can be prepared by oxidizing an indolyl-3-acetaldehyde derivative represented by the Formula XVI.

In this process of the present invention, potassium permanganate, hydrogen peroxide, organic peroxide, silver-oxide, selenium dioxide and copper hydroxide can be used as an oxidizing agent, and especially potassium permanganate or copper hydroxide is most preferable in many cases.

The following groups, for example, are given as the substituents shown by $—A—R^1$, $R^2$ and $R^3$ of the 1-acyl-3-indolyl aliphatic acid derivatives of the said Formula XV which are easily prepared by this method.

$—A—R^1$: benzyl, styryl, cinnamyl, 2-phenylvinyl, 2-(2'-thienyl)-vinyl, 2-(3'-pyridyl)-vinyl, 2 - (2' - furanyl)-vinyl, p-methoxybenzyl, p-methylbenzyl, 2,2-diphenyl-vinyl, 2-(cinnamyl)-vinyl, N-methyl-hexahydro-3-pyridylmethyl, 2 - (4' - pyridyl) - vinyl and 2-(5'-chloro-2'-thienyl)-vinyl.

$—R^2$ and $R^3$: hydrogen, methyl and ethyl.

$—R^6$: methoxy, ethoxy, iso-propyloxy, methyl, ethyl, n-propyl, isopropyl, tertiary-butyl, methylthio, ethylthio and hydrogen.

An indole-3-acetaldehyde derivative (XVI), which is a starting substance of this method, can be prepared according to the following reaction process:

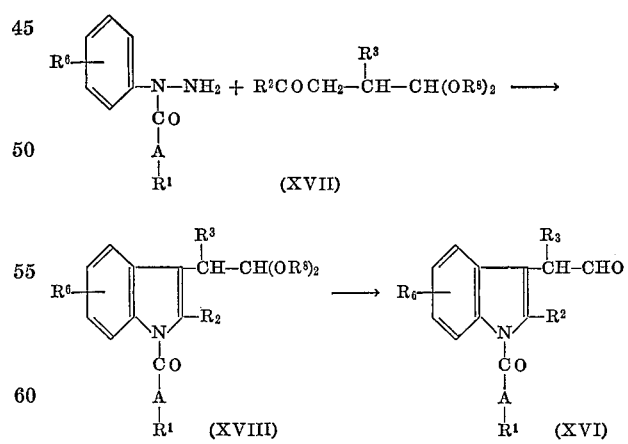

wherein $R^1$, $R^2$, $R^3$, $R^6$ and A have the same meanings as identified above; and $R^8$ means a lower alkyl.

For example, $N^1$-(phenylacetyl)-$N^1$-(p-methoxyphenyl)-hydrazine hydrochloride is reacted with levulinic aldehyde diethylacetal to yield 1-(phenylacetyl)-2-methyl-5-methoxy-3-indolyl-acetaldehyde diethylacetal, and the resulting diethyl-acetal derivative is treated with water in the presence of a small amount of an acid to yield 1- phenylacetyl)-2-methyl-5-methoxy - 3 - indolyl-acetaldehyde as shown by the following reaction formula:

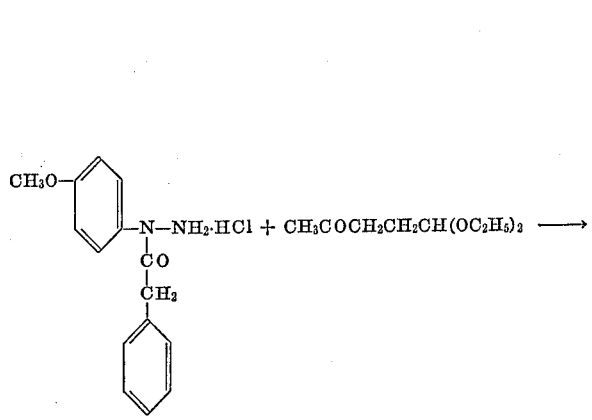

Still further, according to the present invention, a 1-acyl-3-indolylacetic acid derivative of the Formula XV is prepared by oxidizing the corresponding indole-3-ethanol derivative of the Formula XIX.

That is, an indole-3-ethanol derivative (XIX) is oxidized by potassium permanganate or chromic acid to give a 1-acyl-3-indolylacetic acid derivative (XV) in a good yield.

Substituent represented by $R^1$, $R^2$, $R^3$, $R^6$ and A of a 1-acyl-3-indolyl acetic acid derivative (XV) which can be prepared by this method, are as follows:

—A—$R^1$: benzyl, styryl, cinnamyl, 2-(2'-thienyl)-vinyl, 2-(3'-pyridyl)-vinyl, 2-(2'-furanyl)-vinyl, p-methoxybenzyl, p-methylbenzyl, 2,2-diphenylvinyl, 2-(cinnamyl)-vinyl, N-methylhexahydro-3-pyridylmethyl, 2-(4'-pyridyl)-vinyl and 2-(5'-chloro-2'-thienyl)-vinyl.

—$R^2$ and —$R^3$: hydrogen, methyl and ethyl.

—$R^6$: methoxy, ethoxy, iso-propyloxy, methyl, ethyl, n-propyl, iso-propyl, tertiary-butyl, methylthio, ethylthio and hydrogen.

The indole-3-ethanol derivative (XIX), a starting compound of this method, is prepared by following reaction process:

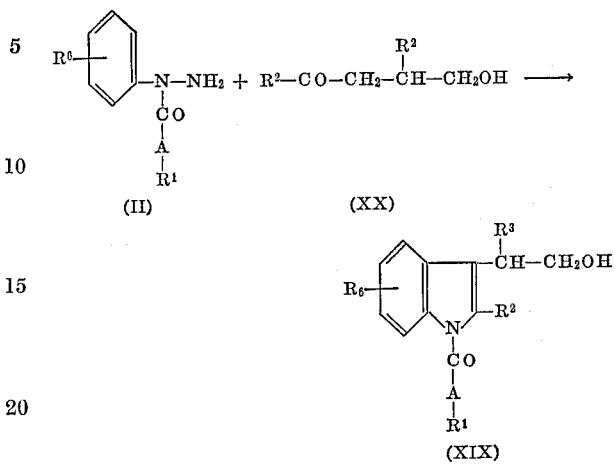

wherein $R^1$, $R^2$, $R^3$, $R^6$ and A have the same meanings as identified above.

For example, 2-(1'-cinnamoyl - 2' - methyl-5'-methoxy-3' - indolyl)-ethanol is obtained in high yield according to the following reaction process:

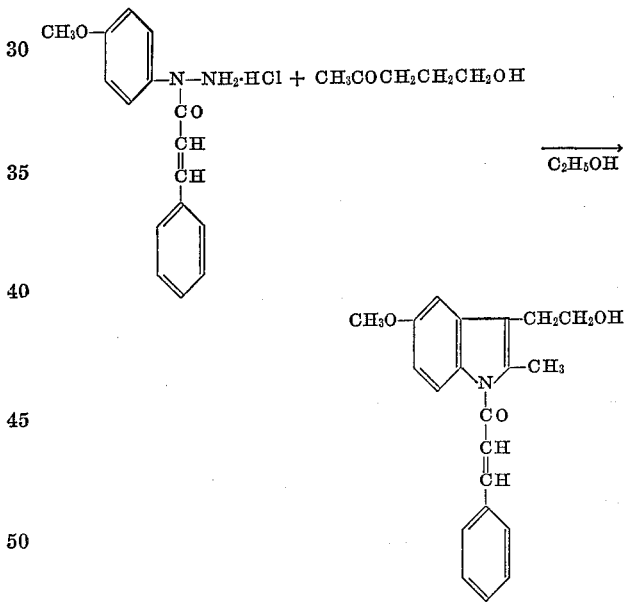

Still further, according to the present invention, a 1-acyl - 3 - indolylacetic acid derivative (XV) is prepared by dehydrogenation of the corresponding 2,3-dihydro-3-indolylacetic acid derivative (XXI).

In this dehydrogenation, non-polar solvent, such as benzene, xylene and toluene and other various organic solvents, such as acetone, acetic acid, chloroform, ethanol and methanol can be used.

As agents for the dehydrogenation, chloranil, selenium dioxide, halogen and the like oxidizing agents can be used.

According to the above method, the following compounds can be easily obtained:

1-cinnamoyl-2-methyl-5-methoxy-3-indolylacetic acid
1-(p-chlorocinnamoyl)-2-methyl-5-methoxy-3-indolylacetic acid
1-(cinnamoylacryloyl)-2-methyl-5-methoxy-3-indolylacetic acid
1-(p-methoxyphenylacetyl)-2-methyl-5-methoxy-3-indolylacetic acid
1-(p-tolylacetyl)-2-methyl-5-methoxy-3-indolylacetic acid A starting substance, 1-acyl - 2,3 - dihydro-3-indolyl aliphatic acid derivative (XXI) is obtained in a high yield by reacting a 2,3-dihydro - 3 - indolyl aliphatic acid derivative with a corresponding acyl chloride in the presence of a hydrogen chloride acceptor.

Still further, according to the present invention a 1-acyl-3-indolylacetic acid derivative of the Formula XXII is prepared by dehydration of a 2-hydro - 3 - hydroxy-3-indolylacetic acid derivative of the Formula XXIII and then, if necessary, by hydrolysis of the resultant ester compound.

The reaction proceeds at a temperature within the range of 70° to 200° C. However, if a reaction does not proceed smoothly, the compound (XXIII) is azeotropically refluxed with an azeotropic solvent, for example benzene, toluene or xylene, or is heated in the presence of a suitable dehydrating agent, for example a proper amount of anhydrous sodium sulfate, whereby a dehydration reaction takes place.

When a 1 - acyl - 3 - indolylacetic acid derivative (XXII), in which $R^5$ is an alkyl group, for example t-butyl group, is treated in the presence of arylsulfonic-acid, it is converted without affecting the acid-amide bonding to the desired free acid.

The 2-hydro - 3 - hydroxy - 3 - indolylacetic acid derivative (XXIII), the starting compound of the above process, is prepared by heating the mixture of alkyl halogenoacetate and a corresponding indole derivative with stirring in a non-polar organic solvent in the presence of zinc powder and, if necessary, a small piece of iodine. One example of the above reaction is as follows:

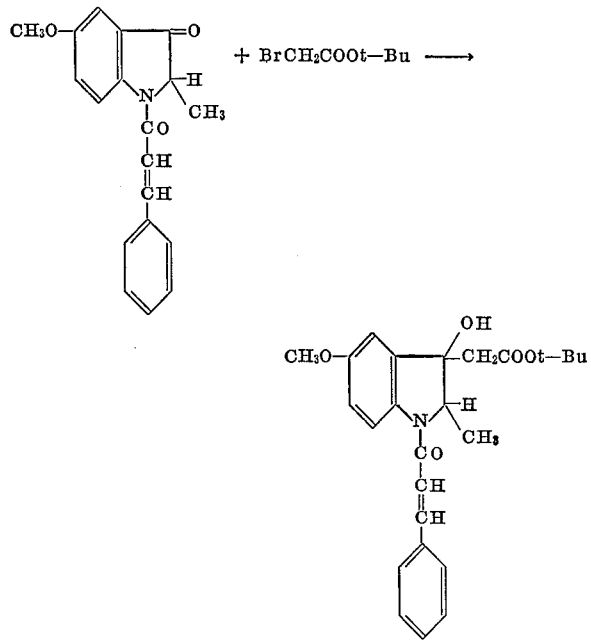

The following compounds, for example, are prepared by this method.

1-phenylacetyl-2-methyl-5-methoxy-3-indolylacetic acid
1-phenylacetyl-2-methyl-5-chloro-3-indolylacetic acid.
1-(β-cinnamylacryloyl)-2-methyl-5-methoxy-3-
1-(β-cinnamoylacryloyl)-2-methyl-5-methoxy-3-indolylacetic acid
1-(p-chlorocinnamoyl)-2-methyl-5-methoxy-3-indolylacetic acid
1-(p-tolylacetyl)-2-methyl-5-methoxy-3-indolylacetic acid
1-(p-methoxycinnamoyl)-2-methyl-5-methoxy-3-indolylacetic acid
1-(phenylacetyl)-2-methyl-5-methoxy-3-indolylacetic acid
1-(naphthylacetyl)-2-methyl-5-methoxy-3-indolylacetic acid.

Still further, according to the present invention, a crude 1-acyl - 3 - indolylacetic acid derivative (XV) is obtained by heating an γ-(N-acyl-anilino)-aliphatic acid derivative (XXIV) in the presence of a suitable catalyst or a dehydrating agent. The crude product thus obtained can be purified by recrystallization from a proper organic solvent or, if the recrystallization fails, a column-chromatography can be used.

3-indolylacetic acid derivatives having the following groups as $R^1$, $R^2$, $R^3$, $R^6$ and A in the Formula XV are easily obtained by this method.

—A—$R^1$: benzyl, styryl, cinnamyl, 2-(2'-thienyl)-vinyl, 2-(3'-pyridyl)-vinyl, 2-(2'-furanyl)-vinyl, 2-(cinnamyl)-vinyl, N-methyl-hexahydro-3-pyridyl-methyl, 2-(4'-pyridyl)-vinyl, 2,2-diphenylvinyl and 2-(3'-chloro-2'-thienyl)-vinyl.

—$R^2$ and —$R^3$: hydrogen, methyl and ethyl.

—$R^6$: methoxy, ethoxy, iso-propyloxy, methyl, ethyl, n-propyl, iso-propyl, tertiary butyl, methylthio, ethylthio and hydrogen.

The γ - (N - acyl-anilino)-aliphatic acid derivative (XXIV), which is a starting substance of this method, is generally prepared by following processes:

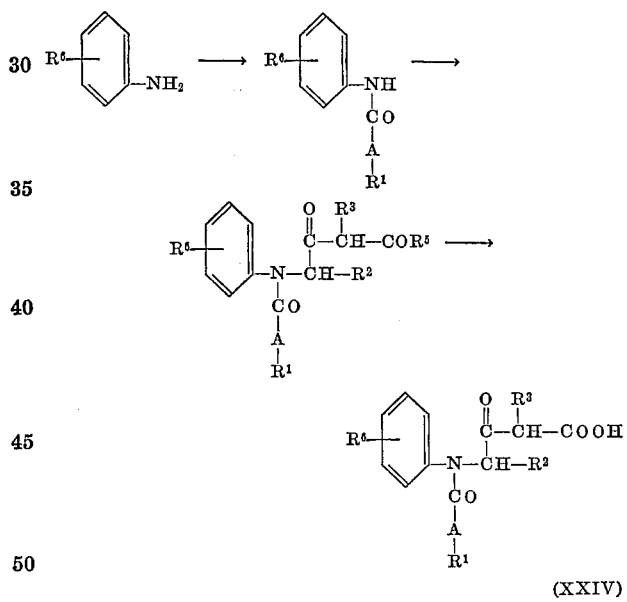

(XXIV)

wherein $R^1$, $R^2$, $R^3$, $R^5$, $R^6$ and A have the same meanings as identified above. For example, the reaction of p-anisidine with cinnamoyl chloride gives N-cinnamoylanisidine, which is subjected to a reaction with tertiary butyl-γ-bromo-β-keto-valeriate to yield tertiary butyl 4 - {N - (p-methoxyphenyl) - N - (phenylacetyl)}amino - 3 - oxo-valeriate. And then the resulting tertiary butyl-4-{N-(p-methoxyphenyl) - N - (phenylacetyl)}amino - 3 - oxo-valeriate is hydrolyzed to give an oily substance of 4-{N-(p-methoxyphenyl) - N - (phenylacetyl)}amino - 3 - oxo-valeric acid.

Still further, according to the present invention, a 1-acyl-3-indolylacetic acid compound (IX) is prepared from a 3-(2'-acylaminophenyl)-levulinic acid derivative represented by the Formula XXV in the presence of inorganic acid in a suitable solvent.

A range of reaction temperatures is from 40° to 120° C., and the most desirable result is obtained at temperature within the range of 60° to 90° C.

After a completion of reaction, a reaction mixture is neutralized, concentrated, and extracted with a suitable organic solvent, and then a separated organic layer is dried and concentrated to a crude crystalline substance.

Recrystallization from ether, acetone or acetone-water gives a pure product.

Among novel 3-indolyl aliphatic acid derivatives of the present invention, there are not only a few useful compounds, which indicate excellent anti-inflammatory action but also possess extremely low toxicity.

In contrast to the above facts, the many compounds of this invention are markedly low in toxicity, and even when over 1,000 mg./kg. of these compounds are orally administered to each of rat and mouse, they scarcely show toxic symptoms and occult bleeding is negative in feces thereof. Nevertheless, the activities of these compounds are much higher than those of 1,2-diphenyl-3,5-dioxo-4-n-butylpyrazolidine (phenylbutazone) and oxyphenbutazone. Therefore, the therapeutic ratios of the compounds of the present invention are far greater than any other drugs. Therefore, these compounds are markedly valuable in practical use.

The therapeutic ratios of these compounds of the present invention, 1-(p-chlorobenzoyl)-2-methyl-5-methoxy-3-indolylacetic acid (Indomethacin) and 1,2-diphenyl-3,5-dioxo-4-n-butylpyrazolidine (Phenylbutazone) are given in the following table.

TABLE

| Compound | Effects | | |
| --- | --- | --- | --- |
| | 50% inhibiting dose [1] | 50% lethal dose of rat, per os (mg./kg.) | Therapeutic ratio [2] |
| 1-(p-chlorobenzoyl)-2-methyl-5-methoxy-3-indolylacetic acid (Indomethacin) | 7.5 | 15 | 2.0 |
| 1,2-diphenyl-3,5-dioxo-4-n-butylpyrazolidine (Phenylbutazone) | 320 | ca. 700 | ca. 2.2 |
| 1-(2'-Furylacryloyl)-2-methyl-5-methoxy-3-indolylacetic acid (present compound) | 25 | >1,000 | >40.0 |
| 1-(β-phenylpropionyl)-2-methyl-5-methoxy-3-indolylacetic acid (present compound) | 250 | >1,500 | >6.0 |
| Ethyl 1-cinnamoyl-2-methyl-5-methoxy-3-indolylacetate (present compound) | 65 | >1,500 | >23.1 |
| 1-phenylacetyl-2-methyl-5-methoxy-3-indolylacetic acid (present compound) | 210 | >1,500 | >7.1 |
| 1-cinnamoyl-2-methyl-5-methoxy-3-indolylacetic acid (present compound) | 12 | >1,500 | >125 |
| 1-(2'-thienylacryloyl)-2-methyl-5-methoxy-3-indolylacetic acid (present compound) | 18 | >1,200 | >67.0 |
| α-[1-cinnamoyl-2-methyl-5-methoxy-3-indolyl]-propionic acid (present compound) | 20 | >1,500 | >75.0 |
| 1-(α-methylcinnamoyl)-2-methyl-5-methoxy-3-indolylacetic acid (present compound) | ca. 40 | >1,500 | >37.5 |

[1] Of *Carraneedin edema* of rat's hind paw, per os (mg./kg.).
[2] 50% lethal dose/50% inhibiting dose of *Carrageenin edema*.

The present inventors prepared many other 1-acyl-3-indolyl aliphatic acid derivatives than the compounds shown in the aforesaid table and evaluated the pharmaceutical effects thereof by animal tests.

The present inventors have found that many derivatives (I) of 1-acyl-3-indolyl aliphatic acid, which are prepared by the present invention, are superior to 1-(p-chlorobenzoyl) - 2 - methyl - 5 - methoxy - 3 - indolylacetic acid (Indomethacin) and 1,2-diphenyl-3,5-dioxo-4-n-butylpyrazolidine (Phenylbutazone) in the therapeutic ratios thereof and has a great practical value.

It has found that these compounds also have comparatively potent analgesic activities shown by Haffner's method, and antipyretic activities in a pyrogen test.

DESCRIPTION OF THE PREFERRED EMBODIMENTS

The following examples are given to illustrate the present invention more particularly but it is not intended to limit the present invention only to them.

EXAMPLE 1

13.8 g. of phenylacetyl chloride was dropped to 13.1 g. of acetaldehyde $N^1$-(p-methoxyphenyl)hydrazone in 50 ml. of pyridine under cooling with ice. Thereafter stirring of the reaction mixture was continued for additional overnight under cooling with ice, and then it was poured into 250 ml. of cold water. As a result, a large amount of crystals were produced. The resultant crystals were collected by filtration, washed with water, and dried to yield 20 g. acetaldehyde $N^1$-(phenylacetyl)-$N^1$-(p-methoxyphenyl)hydrazone, M.P. 98°–101° C.

In a way similar to that in Example 1, the following hydrozones were obtained.

EXAMPLE 2

Acetaldehyde $N^1$ -(β - phenylpropionyl) - $N^1$ - (p-methoxyphenyl)-hydrazone, M.P. 134°–135° C.

EXAMPLE 3

Acetaldehyde $N^1$ - ( p' - chlorophenylacetyl) - $N^1$ - (p-methoxyphenyl)hydrazone, M.P. 93°–96° C.

EXAMPLE 4

Acetaldehyde $N^1$ - {γ - (p' - methoxyphenyl) - n - butyroyl}-$N^1$-(p-methoxyphenyl)hydrazone, M.P. 96°–98° C.

EXAMPLE 5

Acetaldehyde $N^1$ - (α - chlorophenylacetyl) - $N^1$ - (p-methoxyphenyl)hydrazone, M.P. 107°–110° C.

EXAMPLE 6

Acetaldehyde $N^1$ - (α - naphthylacetyl) - $N^1$ - p - methoxyphenyl)hydrazone, M.P. 100°–103° C.

EXAMPLE 7

Acetaldehyde $N^1$ - (m,p - dimethoxyphenylacetyl)-$N^1$-(p-methoxyphenyl)hydrazone, M.P. 88°–90°C.

EXAMPLE 8

Acetaldehyde $N^1$ - cinnamoyl - $N^1$ - (p - methoxyphenyl)hydrazone, M.P. 166°–170° C.

EXAMPLE 9

Acetaldehyde $N^1$-(α-methylcinnamoyl) - $N^1$ - (p - methoxyphenyl)hydrazone, M.P. 114°–115° C.

EXAMPLE 10

Acetaldehyde $N^1$-(p-chlorocinnamoyl)-$N^1$-(p-methoxyphenyl)hydrazone, M.P. 168°–174° C.

EXAMPLE 11

Acetaldehyde $N^1$ - (p-methoxycinnamoyl)-$N^1$-(p-methoxyphenyl)hydrazone, M.P. 172°–179° C.

EXAMPLE 12

Acetaldehyde $N^1$ - (p - tolylacryloyl)-$N^1$-(p-methoxyphenyl)hydrazone, M.P. 169°–172° C.

EXAMPLE 13

Acetaldehyde $N^1$-(m-nitrocinnamoyl)-$N^1$-(p-methoxyphenyl)hydrazone, M.P. 170°–180° C.

EXAMPLE 14

Acetaldehyde $N^1$-($\beta$-2'-furylacryloyl)-$N^1$-(p-methoxyphenyl)hydrazone, M.P. 143°–146° C.

EXAMPLE 15

20 g. of acetaldehyde $N^1$-cinnamoyl-$N^1$-(p-methoxyphenyl)hydrazone was suspended in 100 ml. of ethanol and the suspension mixture was shaken under cooling with ice. 30 g. of gaseous hydrogen chloride was absorbed in the reaction mixture for one hour under cooling with ice. The produced crystals were filtered, washed with 100 ml. of ether and dried to give 18.5 g. of $N^1$-cinnamoyl-$N^1$-(p-methoxyphenyl)hydrazine hydrochloride; M.P. 184° C. (decomposed).

In a way similar to that in Example 15, the following compounds were obtained.

EXAMPLE 16

$N^1$ - (m-nitrocinnamoyl)-$N^1$-(p-methoxyphenyl)hydrazine hydrochloride, M.P. 165°–170° C. (decomp.).

EXAMPLE 17

$N^1$ - cinnamoyl - $N^1$-p-tolyl)hydrazine hydrochloride, M.P. 173°–175° C. (decomp.).

EXAMPLE 18

$N^1$ - ($\alpha$ - phenylcinnamoyl)-$N^1$-(p-methoxyphenyl)hydrazine hydrochloride, M.P. 145°–160° C. (decomp.).

EXAMPLE 19

$N^1$ - ($\beta$ - p-tolylacryloyl)-$N^1$-(p-methoxyphenyl)hydrazine hydrochloride, M.P. 187° C. (decomp.).

EXAMPLE 20

$N^1$ - ($\alpha$ - methylcinnamoyl)-$N^1$-(p-methoxyphenyl)hydrazine hydrochloride, M.P. 174° C. (decomp.).

EXAMPLE 21

$N^1$-(p - chlorocinnamoyl) - $N^1$ - (p-methoxyphenyl)hydrazine hydrochloride, M.P. 179°–182° C. (decomp.).

EXAMPLE 22

$N^1$ - (p-methoxycinnamoyl)-$N^1$-(p-methoxyphenyl)hydrazine hydrochloride, M.P. 178° C. (decomp.).

EXAMPLE 23

$N^1$ - ($\alpha$ - methyl - m - nitrocinnamoyl)-$N^1$-(p-methoxyphenyl)hydrazine hydrochloride, M.P. 168°–171° C. (decomp.).

EXAMPLE 24

$N^1$ - (phenylacetyl) - $N^1$-(p-methoxyphenyl)hydrazine hydrochloride, M.P. 165°–166° C. (decomp.).

EXAMPLE 25

$N^1$ - ($\beta$ - phenylpropionyl)-$N^1$-(p-methoxyphenyl)hydrazine hydrochloride, M.P. 179° C. (decomp.).

EXAMPLE 26

$N^1$ - (p' - chlorophenylacetyl)-$N^1$-(p-methoxyphenyl)hydrazine hydrochloride, M.P. 202°–203° C. (decomp.).

EXAMPLE 27

$N^1$ - {$\gamma$ - (p'-methoxyphenyl)-n-butyroyl}-$N^1$-(p-methoxyphenyl)hydrazine hydrochloride, M.P. 166° C. (decomp.).

EXAMPLE 28

$N^1$ - ($\alpha$ - chlorophenylacetyl) - $N^1$-(p-methoxyphenyl)hydrazine hydrochloride, M.P. 130° C. (decomp.).

EXAMPLE 29

$N^1$ - (diphenylacetyl) - $N^1$ - (p-methoxyphenyl)hydrazine hydrochloride, M.P. 144°–146° C. (decomp.).

EXAMPLE 30

$N^1$ - (p' - nitrophenylacetyl)-$N^1$-(p-methoxyphenyl)hydrazine hydrochloride, M.P. 204°–205° C. (decomp.).

EXAMPLE 31

$N^1$ - ($\alpha$ - naphthylacetyl)-$N^1$-(p-methoxyphenyl)hydrazine hydrochloride, M.P. 173° C. (decomp.).

EXAMPLE 32

$N^1$-phenylacetyl-$N^1$-(p-methylphenyl)hydrazine hydrochloride, M.P. 151°–152° C. (decomp.).

EXAMPLE 33

$N^1$-(phenylacetyl)-$N^1$-phenylhydrazine hydrochloride, M.P. 145°–149° C. (decomp.).

EXAMPLE 34

$N^1$ - (phenylacetyl)-$N^1$-(p-chlorophenyl)hydrazine hydrochloride, M.P. 167° C. (decomp.).

EXAMPLE 35

$N^1$ - (m,p - dimethoxyphenylacetyl) - $N^1$ - (p-methoxyphenyl)hydrazine hydrochloride, M.P. 165° C. (decomp.).

EXAMPLE 36

58 g. of acetaldehyde $N^1$-($\beta$-2'-furylacryloyl)-$N^1$-(p-methoxyphenyl)hydrazone was suspended in 400 ml. of ethanol, and the suspension mixture was shaken under cooling with ice.

30 g. of gaseous hydrogen chloride was absorbed in the reaction mixture over one hour.

The produced crystals were filtered, washed with 100 ml. of ether and dried to give 35.0 g. of $N^1$-($\beta$-2'-furylacryloyl)-$N^1$-(p-methoxyphenyl)hydrazine hydrochloride; M.P. 166° C. (decomp.).

In a way similar to this, $N^1$-($\beta$-2'-thienylacryloyl)-$N^1$-(p-methoxyphenyl)hydrazine hydrochloride was obtained.

EXAMPLE 37

7.7 g. of phenylacetyl chloride was dropwise added to the solution mixture of 6.1 g. of p-tolylhydrazine and 5 g. of triethylamine in 150 ml. of toluene under cooling with ice.

Thereafter the temperature of the reaction mixture was raised slowly up to 70°–75° C. and the heating of the mixture was continued at 70°–75° C. for an additional 20 minutes. After the reaction mixture was allowed to cool, the crystals produced were removed by filtration, and the filtrate was concentrated to oily residue, which was recrystallized from a solution mixture of ethanol and water to give $N^1$-phenylacetyl-p-tolylhydrazine, M.P. 86°–87° C. It was treated with ethanolic hydrogen chloride to give $N^1$-phenylacetyl-p-tolylhydrazine hydrochloride; M.P. 151°–152° C. (decomp.).

EXAMPLE 38

6.0 g. of cinnamoyl chloride was dropwise added to a mixture of 8.7 g. of p-methoxyphenylhydrazine hydrochloride, 10.1 g. of triethylamine and 200 ml. of toluene under cooling at $-5°$ to 0° C.

The reaction mixture was stirred at 20°–25° C. for one hour. The separated precipitates were filtered off and dry gaseous hydrogen chloride was introduced into the filtrate. As a result a large amount of crystals of $N^1$-cinnamoyl-$N^1$-(p-methoxyphenyl)hydrazine hydrochloride were produced. These crystals were collected by filtration and washed with 20 ml. of ether and dried to yield $N^1$-cinnamoyl-$N^1$-(p-methoxyphenyl)hydrazine hydrochloride of M.P. 183°–185° C.

The following compounds were prepared in a way similar to that in Example 38.

EXAMPLE 39

$N^1$-(phenylacetyl)-$N^1$-(p-methoxyphenyl)hydrazine hydrochloride, M.P. 166°–167° C. (decomp.).

EXAMPLE 40

$N^1$ - cinnamoyl-$N^1$-(p-methoxyphenyl)hydrazine hydrochloride, M.P. 179° C. (decomp.).

EXAMPLE 41

$N^1$-(p'-methoxycinnamoyl)-$N^1$-(p-methoxyphenyl) hydrazine hydrochloride, M.P. 178°C. (decomp.).

EXAMPLE 42

$N^1$- (p-chlorophenylacetyl)-$N^1$-(p-methoxyphenyl) hydrazine hydrochloride, M.P. 202° C. (decomp.).

EXAMPLE 43

$N^1$-($\beta$-2'-furylacryloyl)-$N^1$-(p-methoxyphenyl)hydrazine hydrochloride, M.P. 166° C. (decomp.).

EXAMPLE 44

$N^1$-($\alpha$-chlorophenylacetyl) - $N^1$- (p-methoxyphenyl)hydrazine hydrochloride, M.P. 123° C. (decomp.).

EXAMPLE 45

$N^1$-(diphenylacetyl) - $N^1$ - (p-methoxyphenyl)hydrazine hydrochloride, M.P. 140°–145° C. (decomp.).

EXAMPLE 46

$N^1$-($\alpha$-phenyl-n-butyroyl) - $N^1$ - (p-methoxyphenyl)hydrazine hydrochloride, M.P. 159° C. (decomp.).

EXAMPLE 47

$N^1$-($\beta$-phenylpropionyl) - $N^1$-(p-methoxyphenyl)hydrazine hydrochloride, M.P. 179° C. (decomp.).

EXAMPLE 48

$N^1$-cinnamoyl-$N^1$-(m-methoxyphenyl)hydrazine hydrochloride, M.P. 168°–169° C. (decomp.).

EXAMPLE 49

A mixture of 10 g. of $N^1$-(phenylacetimidoyl)-$N^1$-(p-methoxyphenyl)hydrazine hydrochloride, 5 g. of levulinic acid and 30 ml. of acetic acid was heated at 80°–85° C. for 3 hours under vigorous stirring.

After the reaction mixture was allowed to cool 50 ml. of water was added thereto to give crystals. They were collected by filtration, washed with 50 ml. of water and recrystallized from a mixture of acetone and water to give 1 - phenylacetyl-2-methyl-5-methoxy-3-indolylacetic acid, M.P. 138°–139° C.

The following compounds were prepared according to a method similar to that of Example 49.

EXAMPLE 50

1 - cinnamoyl-2-methyl-5-methoxy-3-indolylacetic acid, M.P. 164°–165° C.

EXAMPLE 51

$\gamma$-(1 - cinnamoyl-2-methyl-5-methoxy-3-indolyl)butyric acid, M.P. 125°–126° C.

EXAMPLE 52

$\beta$ - (1 - cinnamoyl - 2-methyl-5-methoxy-3-indolyl)propionic acid, M.P. 189°–190° C.

EXAMPLE 53

1-($\beta$-2-furylacryloyl)-2-methyl - 5 - methoxy-3-indolylactic acid, M.P. 163°–164° C.

EXAMPLE 54

1 - (p - methoxycinnamoyl)-2-methyl-5-methoxy-3-indolylacetic acid, M.P. 193°–195° C.

EXAMPLE 55

1-(p-chlorophenylacetyl) - 2 - methyl - 5 - methoxy-3-indolylacetic acid, M.P. 180°–182° C.

EXAMPLE 56

Ethyl 1-cinnamoyl-2-methyl-5-methoxy-3-indolylacetate, M.P. 162°–163° C.

EXAMPLE 57

1 - ($\alpha$ - phenylbutyroyl) - 2-methyl-5-methoxy-3-indolylacetic acid, M.P. 123°–125° C.

EXAMPLE 58

1 - (3',4' - dimethoxyphenyl)-2-methyl-5-methoxy-3-indolylacetic acid, M.P. 169°–170° C.

EXAMPLE 59

1 - ($\alpha$ - chlorophenylacetyl)-2-methyl-5-methoxy-3-indolylacetic acid, M.P. 165°–166° C.

EXAMPLE 60

20 g. of $N^1$ - (phenylacetyl)-$N^1$-(p-methoxyphenyl)-hydrazine hydrochloride was added to 30 g. of levulinic acid. The mixture was heated at 76° C. for 3 hours, and then allowed to stand at room temperature overnight. The precipitates were collected by filtration, washed with water and dried to give crude crystals of 1-(phenylacetyl)-2-methyl-5-methoxy-3-indolylacetic acid, which was recrystallized from acetone-water to give 9.7 g. of a purified product, M.P. 141.5°–143° C.

*Microanalysis.*—Calculated (percent): C, 71.20; H, 5.68; N, 4.15. Found (percent): C, 71.54; H, 5.84; N, 3.96.

According to this method, 1-(phenylacetyl)-2-methyl-5-methoxy-3-indolylacetic acid was prepared in a similar yield from a mixture of 10 g. of levulinic acid and 25 ml. of acetic acid instead of 30 g. of levulinic acid.

EXAMPLE 61

A mixture of 10 g. of $N^1$-(diphenylacetyl)-$N^1$-(p-methoxyphenyl)hydrazine hydrochloride and 20 g. of levulinic acid was heated at 75°–83° C. for 2.5 hours with stirring. After the completion of reaction, the reaction mixture was poured into water, and then precipitate was produced. It was collected by filtration, washed with water and recrystallized from acetone-water to give light gray crystals of 1-diphenylacetyl-2-methyl-5-methoxy-3-indolylacetic acid; M.P. 150°–151° C.

*Microanalysis.*—Calculated (percent): C, 75.53; H, 5.61; N, 3.39. Found (percent): C, 74.92; H, 5.56; N, 3.69.

EXAMPLE 62

In a way similar to that of Example 61, 1-($\alpha$-chlorophenylacetyl) - 2-methyl-5-methoxy-3-indolylacetic acid, M.P. 165°–166° C., was prepared from $N^1$-($\alpha$-chlorophenylacetyl) - $N^1$-(p-methoxyphenyl)hydrazine hydrochloride and levulinic acid.

*Microanalysis.*—Calculated (percent): C, 64.18; H, 4.88; N, 3.77; Cl, 9.54. Found (percent): C, 63.70; H, 4.89; N, 3.86; Cl, 9.77.

EXAMPLE 63

In a way similar to that in Example 61 1-($\alpha$-phenylbutyroyl)-2-methyl-5-methoxy-3-indolylacetic acid, M.P. 123.5°–125° C. was prepared from $N^1$-($\alpha$-phenylbutyroyl)-$N^1$-(p-methoxyphenyl)hydrazine hydrochloride and levulinic acid.

*Microanalysis.*—Calculated (percent): C, 72.33; H, 6.30; N, 3.84. Found (percent): C, 72.51; H, 6.38; N, 3.94.

EXAMPLE 64

In a way similar to that in Example 61, 1-($\alpha$-naphthylacetyl) - 2-methyl-5-methoxy-3-indolylacetic acid, M.P. 165.5°–166.5° C. was prepared from $N^1$-($\alpha$-naphthylacetyl) - $N^1$ - (p-methoxyphenyl)hydrazine hydrochloride and levulinic acid.

*Microanalysis.*—Calculated (percent): C, 74.39; H, 5.42; N, 3.62. Found (percent): C, 74.43; H, 5.54; N, 3.70.

EXAMPLE 65

A mixture of 10 g. of $N^1$-(diphenylacetyl)-$N^1$-(p-methoxyphenyl)hydrazine hydrochloride and 20 g. of ethyl levulinate was heated in 20 ml. of ethanol at 80°–83° C. for 6.5 hours with stirring. After completion of the reaction, the mixture was allowed to cool and poured into water to give a dark blue homogenous solution, which was extracted with ether, and then the ether layer was dried on anhydrous sodium sulfate and concentrated to give light yellow crystals. The recrystallization from ether-alcohol gave pure pale yellow crystals of ethyl 1-diphenylacetyl - 2 - methyl-5-methoxy-3-indolylacetate, M.P. 121°–122° C.

*Microanalysis.*—Calculated (percent): C, 76.19; H, 6.12; N, 3.17. Found (percent): C, 75.59; H, 6.21; N, 3.13.

EXAMPLE 66

In a way similar to that in Example 61, 1-(p-chlorophenylacetyl) - 2-methyl-5-methoxy-3-indolylacetic acid, M.P. 178° C., was prepared from 10 g. of $N^1$-(p-chlorophenylacetyl) - $N^1$-(p-methoxyphenyl)hydrazine hydrochloride and 30 ml. of levulinic acid.

*Microanalysis.*—Calculated (percent): C, 64.60; H, 4.89; N, 3.77. Found (percent): C, 64.45; H, 4.96; N, 3.86.

EXAMPLE 67

5 g. of $N^1$ - (p-nitrophenylacetyl)-$N^1$-(p-methoxyphenyl)hydrazine hydrochloride and 10 g. of levulinic acid were added to 30 ml. of acetic acid. The mixture was heated at 90°–95° C. for 2 hours under stirring. Thereafter the mixture was poured into 150 ml. of water, and the resultant precipitates were collected by filtration, washed with water and recrystallized from dioxane to give 1 - (p-nitrophenylacetyl)-2-methyl-5-methoxy-3-indolylacetic acid, M.P. 207° C.

*Microanalysis.*—Calculated (percent): C, 62.82; H, 4.75; N, 7.33. Found (percent): C, 63.11; H, 4.77; N, 7.26.

EXAMPLE 68

In a way similar to that in Example 61, 1-(γ-p-methoxyphenyl-n-butyroyl) - 2 - methyl-5-methoxy-3-indolylacetic acid, M.P. 163° C., was prepared from $N^1$-(γ-p-methoxyphenyl-n-butyroyl) - $N^1$ - (p-methoxyphenyl)-hydrazine sulfate and levulinic acid.

EXAMPLE 69

In a way similar to that in Example 61, 1-m,p-dimethoxyphenylacetyl) - 2 - methyl-5-methoxy-3-indolylacetic acid, M.P. 169°–170° C., was prepared from $N^1$-(m,p-dimethoxyphenylacetyl) - $N^1$-(p-methoxyphenyl)hydrazine hydrochloride and levulinic acid.

*Microanalysis.*—Calculated (percent): C, 66.49; H, 5.83; N, 3.55. Found (percent): C, 66.46; H, 5.93; N, 3.41.

EXAMPLE 70

In a way similar to that in Example 61, 1-(β-phenyl-n-propionyl)-2-methyl-5-methoxy-3-indolylacetic acid, M.P. 163°–164° C., was prepared from $N^1$-(β-phenyl-n-propionyl) - $N^1$-(p-methoxyphenyl)hydrazine hydrochloride and levulinic acid.

*Microanalysis.*—Calculated (percent): C, 71.78; H, 6.02; N, 3.98. Found (percent): C, 71.85; H, 6.07; N, 4.08.

EXAMPLE 71

30 g. of $N^1$-cinnamoyl-$N^1$-(p-methoxyphenyl)hydrazine hydrochloride was added into 50 g. of levulinic acid, and the mixture was heated at 75° C. for 2 hours under stirring. Thereafter the reaction mixture was poured into 200 ml. of water under vigorous stirring, the resultant crystals were collected by filtration, dried to give 34 g. of crude crystals of 1 - cinnamoyl-2-methyl-5-methoxy-3-indolylacetic acid, M.P. 158°–160° C., which was recrystallized from acetone twice. The melting point was raised to 164°–165° C.

EXAMPLE 72

In a way similar to that in Example 71, 1-(β-p-tolyl-acryloyl - 2-methyl-5-methoxy-3-indolylacetic acid, M.P. 195° C., was prepared by reacting $N^1$-(β-p-tolyl-acryloyl)-$N^1$ - (p - methoxy-phenyl)hydrazine hydrochloride with levulinic acid.

EXAMPLE 73

In a way similar to that in Example 71, 1-(p-chlorocinnamoyl) - 2-methyl-5-methoxy-3-indolylacetic acid, M.P. 220°–221° C., was prepared by reacting $N^1$-(p-chlorocinnamoyl) - $N^1$-(p-methoxyphenyl)hydrazine hydrochloride with levulinic acid.

*Microanalysis.*—Calculated (percent): C, 65.71; H, 4.69; N, 3.65; Cl, 9.26. Found (percent): C, 65.46; H, 4.64; N, 3.56; Cl, 8.93.

EXAMPLE 74

According to a method similar to that in Example 71, 1 - (α-methylcinnamoyl) - 2-methyl-5-methoxy-3-indolylacetic acid, M.P. 153.5°–154.5° C., was prepared by reacting $N^1$-(α-methylcinnamoyl)-$N^1$-(p-methoxyphenyl)hydrazine hydrochloride with levulinic acid.

EXAMPLE 75

20 g. of $N^1$-cinnamoyl-$N^1$-(p-methoxyphenyl)hydrazine hydrochloride and 12 g. of γ-acetyl-n-butyric acid were added to 30 ml. of acetic acid, and the mixture was stirred at 75° C. for 2 hours. After completion of the reaction, the reaction mixture was allowed to cool, poured into 150 ml. of water, and the resultant precipitates were collected by filtration, washed with water and dried to give 18 g. of crude crystals of β-(1-cinnamoyl-2-methyl-5-methoxy-3-indolyl)propionic acid, M.P. 182°–186° C. The crude product was recrystallized from acetone-water to give 9.3 g. of the pure product, whereby the melting point was raised to 189°–190° C.

*Microanalysis.*—Calculated (percent): C, 72.71; H, 5.83; N, 3.58. Found (percent): C, 72.59; H, 5.96; N, 3.43.

EXAMPLE 76

In a way similar to that in Example 75, α-(1-cinnamoyl-2 - methyl - 5-methoxy-3-indolyl)butyric acid, M.P. 125°–126° C., was prepared by reacting $N^1$-cinnamoyl-$N^1$-(p-methoxyphenyl)hydrazine hydrochloride with δ-acetyl-n-valeric acid.

*Microanalysis.*—Calculated (percent): C, 73.19; H, 6.14; N, 3.71. Found (percent): C, 73.23; H, 6.14; N, 3.61.

EXAMPLE 77

In a way similar to that in Example 75, yellow needle crystals of 1 - (m-nitrocinnamoyl)-2-methyl-5-methoxy-3-indolylacetic acid, M.P. 203°–204° C., was prepared by reacting $N^1$-(m - nitrocinnamoyl)-$N^1$-(p-methoxyphenyl)hydrazine hydrochloride with levulinic acid.

*Microanalysis.*—Calculated (percent): C, 63.94; H, 4.60; N, 7.10. Found (percent): C, 63.98; H, 4.66; N, 7.01.

EXAMPLE 78

5 g. of $N^1$-(β-2'-furylacryloyl)-$N^1$-(p-methoxyphenyl)-hydrazine hydrochloride was added to 15 g. of levulinic acid, and the mixture was stirred at 75°–80° C. for 2 hours. Thereafter, the mixture was allowed to cool and poured into cooled water. The resultant brown precipitates were collected by filtration, washed with water thoroughly. The washing liquor and the precipitates were combined and ether was added thereto, and then the mixture was shaken, and the ether layer was separated. Similar procedures were repeated several times, and each ether layer was combined, dried on anhydrous sodium sulfate and concentrated to oily residue, which was recrystallized from methanol twice to give 3 g. of yellow crystals of 1-(β-2'-furylacryloyl) - 2-methyl-5-methoxy-3-indolylacetic acid, M.P. 163.5°–165° C.

*Microanalysis.*—Calculated (percent): C, 67.26; H, 5.01; N, 4.13. Found (percent): C, 67.26; H, 5.13; N, 3.94.

EXAMPLE 79

10 g. of $N^1$-cinnamoyl-$N^1$-(p-methoxyphenyl)hydrazine hydrochloride and 20 g. of α-methyl levulinic acid were added to 10 ml. of acetic acid and the mixture was stirred at 80° C. for 2 hours. The reaction mixture was allowed to stand to cool, and poured into water to give an oily substance, which was washed with water thoroughly, and extracted with each 100 ml. of ether three times. Each ether layer was combined and dried on anhydrous sodium sulfate, and ether was removed by distillation to give a residue, which was dissolved in ethyl acetate and column-chromatographed on neutralized active alumina to give crystals of α-(1-cinnamoyl-2-methyl-5-methoxy-3-indolyl) propionic acid. The recrystallization from acetone-water gave light yellow crystals of pure product, M.P. 154.5°–155.5° C.

*Microanalysis.*—Calculated (percent): C, 72.73; H, 5.79; N, 3.86. Found (percent): C, 72.97; H, 5.70; N, 3.92.

EXAMPLE 80

In a way similar to that in Example 75, 1-(p-methoxycinnamoyl)-2-methyl-5-methoxy-3-indolylacetic acid, M.P. 193°–195° C., was prepared from $N^1$-(p-methoxycinnamoyl)-$N^1$-(p-methoxyphenyl)hydrazine hydrochloride and levulinic acid.

*Microanalysis.*—Calculated (percent): C, 70.68; H, 5.72; N, 3.90. Found (percent): C, 69.97; H, 5.68; N, 3.79.

EXAMPLE 81

In a way similar to that in Example 71, ethyl 1-cinnamoyl-2,5-dimethyl-3-indolylacetate, M.P. 198°–200° C., was prepared from $N^1$-cinnamoyl-$N^1$-(p-tolyl)hydrazine hydrochloride and ethyl levulinate.

EXAMPLE 82

In a way similar to that in Example 71, 1-α-phenylcinnamoyl-2-methyl-5-methoxy-3-indolylacetic acid, M.P. 174°–175° C., was prepared from $N^1$-α-phenyl-cinnamoyl-$N^1$-(p-methoxyphenyl)hydrazine hydrochloride and levulinic acid.

EXAMPLE 83

According to a method similar to that in Example 71, 1-phenylacetyl-2-methyl-5-methoxy - 3 - indolylacetic acid, M.P. 137°–139° C., was prepared from $N^1$-(phenylacetyl)-$N^1$-(p-methoxyphenyl)hydrazine hydrochloride and levulinic acid.

EXAMPLE 84

In a way similar to that in Example 71, 1-(p-chlorocinnamoyl)-2-methyl-5-methoxy-3-indolylacetic acid, M.P. 220–221° C., was prepared from $N^1$-(p-chlorocinnamoyl)-$N^1$-(p-methoxyphenyl)hydrazine hydrochloride and levulinic acid.

EXAMPLE 85

A mixture of 4.0 g. of $N^1$-(α-chlorophenylacetyl)-$N^1$-(p-methoxyphenyl)hydrazine hydrochloride and 2.4 g. of acetonylmalonic acid was heated in 10 ml. of acetic acid at 85° C. for 4 hours with stirring. Thereafter, the reaction mixture was allowed to cool, and was poured into 25 ml. of cold water, and then crystals were produced. They were collected by filtration, and dried to give crude product of 1-(α-chlorophenylacetyl)-2-methyl-5-methoxy - 3 - indolylacetic acid. The recrystallization from acetone-water gave fine white needle crystals, M.P. 165°–166° C.

In a way similar to that in Example 85, the following compounds were prepared.

EXAMPLE 86

1-cinnamoyl-2-methyl-5-methoxy-3 - indolylacetic acid, M.P. 164°–165° C.

EXAMPLE 87

1-phenylacetyl-2-methyl-5-methoxy-3-indolylacetic acid, M.P. 141.5°–143° C.

EXAMPLE 88

1-(α-naphthylacetyl)-2-methyl-5-methoxy - 3 - indolylacetic acid, M.P. 165.5°–166.5° C.

EXAMPLE 89

A mixture of 3.6 g. of $N^1$-(phenylacetyl)-$N^1$-(p-methoxyphenyl)hydrazine hydrochloride, and 2.4 g. of acetosuccinic acid was heated in 10 ml. of acetic acid at 85° C. for 4 hours with stirring. Thereafter, the mixture was allowed to cool, and was poured into 25 ml. of cold water. The produced crystals were collected by filtration and dried to give a crude product of 1-(phenylacetyl)-2-methyl-5-methoxy-3-indolylacetic acid. The recrystallization from acetone-water gave white needle crystals, M.P. 142°–143° C.

By this method, the same product was obtained by using 2-keto-adipic acid instead of acetosuccinic acid.

EXAMPLE 90

In a way similar to that in Example 89, 1-cinnamoyl-2-methyl-5-methoxy-3-indolylacetic acid, M.P. 164°–165° C., was prepared from $N^1$-cinnamoyl-$N^1$-(p-methoxyphenyl)hydrazine hydrochloride and acetosuccinic acid.

EXAMPLE 91

4.8 g. of tertiary butyl 1-(phenylacetyl)-2-methyl-5-methoxy-3-indolylacetate was added to 40 ml. of benzene, then a small amount of p-toluenesulfonic acid was added thereto. The reaction mixture was refluxed to complete the reaction. After the heating, the mixture was left at room temperature. After cooling it was washed with 60 ml. of water twice, and was dried. The reaction solvent was removed by distillation, and the resultant residue was purified and crystallized by using acetone and recrystallized from acetone-water to give 1-(phenylacetyl)-2-methyl-5-methoxy-3-indolylacetic acid, M.P. 138°–139° C.

In a way similar to that in Example 91, the following compounds were prepared.

EXAMPLE 92

1-(α-naphthylacetyl)-2-methyl-5 - methoxy - 3 - indolylacetic acid, M.P. 165°–167° C.

EXAMPLE 93

1-{β-(p-tolyl)acryloyl}-2-methyl-5-methoxy-3 - indolylacetic acid, M.P. 195°–196° C.

EXAMPLE 94

1-(p-chlorocinnamoyl)-2-methyl-5-methoxy-3 - indolylacetic acid, M.P. 220°–221° C.

EXAMPLE 95

γ-(1-cinnamoyl-2-methyl-5-methoxy-3 - indolyl)butyric acid, M.P. 125°–126° C.

EXAMPLE 96

1-(β-2′-furylacryloyl)-2-methyl - 5 - methoxy-3-indolylacetic acid, M.P. 163°–165° C.

EXAMPLE 97

α-(1-cinnamoyl-2-methyl - 5 - methoxy-3-indolyl)propionic acid, M.P. 154°–156° C.

EXAMPLE 98

1-(p-methoxycinnamoyl)-2-methyl - 5 - methoxy-3-indolylacetic acid, M.P. 193°–195° C.

EXAMPLE 99

1-cinnamoyl-2-methyl - 5 - methoxy - 3 - indolylacetic acid, M.P. 164° C.

EXAMPLE 100

7.6 g. of acetaldehyde $N^1$-phenylacetyl-$N^1$-(p-methoxyphenyl)hydrazone was added to 30 g. of levulinic acid containing 1 g. of hydrogen chloride, and the mixture was heated at 80° C. for 3 hours. Thereafter, the mixture was allowed to cool, and poured into 200 ml. of water. And then the solid produced was collected by filtration, and was column-chromatographed on silica gel by using ethyl acetate as developer and then was recrystallized from acetone-water to give white needle crystals of 1-phenylacetyl-2-methyl-5-methoxy-3-indolylacetic acid, M.P. 139°–142° C.

EXAMPLE 101

1.7 g. of acetomalonic acid and 2.6 g. of acetaldehyde $N^1$ - phenylacetyl - $N^1$ - (p - methoxyphenyl)hydrazone were added to 20 ml. of acetic acid containing 0.37 g. of dried hydrogen chloride, and the mixture was stirred at 95° C. for 4 hours. Thereafter, the mixture was allowed to cool, and poured into cold water and then benzene was added thereto. The mixture was shaken thoroughly and a benzene layer was separated, and it was dried on anhydrous sodium sulfate and concentrated by distillation. The resultant solid was dissolved in acetic acid, and the solution was column-chromatographed on silica gel and then recrystallized from acetone-water to give 1-phenylacetyl-2-methyl-5-methoxy - 3 - indolylacetic acid, M.P. 140°–142° C.

EXAMPLE 102

5.0 g. of $N^1$-(phenylacetyl)-$N^1$-(p-methoxyphenyl)hydrazine hydrochloride was added to 20 ml. of γ-oxo-n-butyraldehyde diethyl acetal, and the mixture was heated at 80° C. for 6 hours. Thereafter the mixture was cooled, concentrated under reduced pressure and allowed to stand overnight. The resultant solid was collected by filtration and washed with water, and then recrystallized from ethanol to give 1-(phenylacetyl)-2-methyl-5-methoxy-indole-3-acetaldehyde diethylacetal.

EXAMPLE 103

A suspension of 12 g. of silver oxide in 50 ml. of benzene was slowly added to 14 g. of 1-(phenylacetyl)-2-methyl-5-methoxy-3-indolylacetaldehyde under stirring. After completion of the reaction, the reaction mixture was filtered within 10 minutes and the filtrate was concentrated under reduced pressure to dryness. Recrystallization from ethanol gave 1-(phenylacetyl)-2-methyl-5-methoxy-3-indolylacetic acid, M.P. 138°–139° C.

In a way similar to that in Example 103, the following compound was prepared.

EXAMPLE 104

1-cinnamoyl-2-methyl-5-methoxy-3-indolylacetic acid, M.P. 164°–165° C., was prepared from 1-cinnamoyl-2-methyl-5-methoxy-3-indolylacetaldehyde.

EXAMPLE 105

5.0 g. of $N^1$ - (phenylacetyl)-$N^1$-(p-methoxyphenyl)hydrazine hydrochloride was added to 20 ml. of 4-oxo-n-pentanol, and the mixture was heated at 80° C. with stirring. After completion of the reaction, the filtrate was concentrated to give a solid substance. Recrystallization from a mixture of ethanol and water gave 2-(1'-phenylacetyl-2'-methyl-5'-methoxyindole-3')ethanol.

EXAMPLE 106

6 g. of 2-(1'-phenylacetyl-2'-methyl-5'-methoxy-indole-3')ethanol was added to acetone, and then 5 g. of potassium permanganate was slowly added to the mixture at 50° C. The mixture was heated at the same temperature for an additional one hour and then was allowed to stand at room temperature. The precipitates produced were filtered off and washed with acetone. The filtrates were collected and concentrated under reduced pressure to dryness. Recrystallization of the solid residue from ethanol gave 1-phenylacetyl-2-methyl-5-methoxy-3-indolylacetic acid, M.P. 137°–139° C.

EXAMPLE 107

In a way similar to that in Example 106, 1-cinnamoyl-2-methyl-5-methoxy-3-indolylacetic acid was prepared, M.P. 164°–165° C.

EXAMPLE 108

4.3 g. of 1-phenylacetyl-2-methyl-5-methoxy-2,3-dihydro-3-indolylacetic acid was added to 100 ml. of benzene and then 7.5 g. of chloranil was added thereto. The mixture was heated under reflux for 3 hours. Thereafter the mixture was concentrated under reduced pressure to a solidal residue, which was diluted with acetone. After removing unsoluble substance by filtration, the acetone solution was concentrated to dryness under reduced pressure to give crude crystals of 1-phenylacetyl-2-methyl-5-methoxy-3-indolyacetic acid. Recrystallization from acetone-water to give a light yellow pure product, M.P. 142°–143° C.

In a way similar to that in Example 108, the following compounds were prepared.

EXAMPLE 109

1-cinnamoyl-2-methyl-5-methoxy-3-indolylacetic acid, M.P. 163°–164° C.

EXAMPLE 110

γ-(1-cinnamoyl-2-methyl - 5 - methoxy - 3 - indolyl) butyric acid, M.P. 125°–126° C.

EXAMPLE 111

42 g. of tertiary-butyl 1 - cinnamoyl - 2 - hydro - 2 - methyl - 3 - hydroxy - 5 - methoxy - 3 - indolylacetate was added to 500 ml. of toluene, and then 3 g. of p-toluenesulfonic acid was added thereto. The mixture was heated at 100° C. for 3 hours with stirring. After completion of the reaction, the reaction mixture was washed with water three times and was dried on anhydrous sodium sulfate. Thereafter the solution mixture was concentrated and allowed to stand in a refrigerator to give crude crystals of 1 - cinnamoyl - 2 - methyl - 5 - methoxy-3-indolylacetic acid. Recrystallization from acetone-water gave the pure product, M.P. 164°–165° C.

*Microanalysis.*—Calculated (percent): C, 72.19; H, 5.48; N, 4.01. Found (percent): C, 72.46; H, 5.71; N, 4.03.

In a way similar to that in Example 111, the following compounds were prepared.

EXAMPLE 112

1 - α - naphthylacetyl - 2 - methyl - 5 - methoxy - 3 - indolylacetic acid, M.P. 165°–167° C.

*Microanalysis.*—Calculated (percent): C, 74.50; H, 5.47; N, 3.62. Found (percent): C, 74.48; H, 5.58; N, 3.71.

EXAMPLE 113

1 - (α - phenylbutyroyl) - 2 - methyl - 5 - methoxy-3-indolylacetic acid, M.P. 123.5°–125° C.

*Microanalysis.*—Calculated ((percent): C, 72.33; H, 6.30; N, 3.84. Found (percent): C, 72.51; H, 6.38; N, 3.94.

EXAMPLE 114

1 - (p - chlorophenylacetyl) - 2 - methyl - 5 - methoxy-3-indolylacetic acid, M.P. 178° C.

*Microanalysis.*—Calculated (percent): C, 64.60; H, 4.89; N, 3.77. Found (percent): C, 64.45; H, 4.96; N, 3.86.

EXAMPLE 115

1 - (β - phenyl - n - propionyl) - 2 - methyl - 5 - methoxy-3-indolylacetic acid, M.P. 163°–164° C.

*Microanalysis.*—Calculated (percent): C, 71.78; H, 6.02; N, 3.98. Found (percent): C, 71.85; H, 6.07; N, 4.08.

EXAMPLE 116

1 - (m,p - dimethoxyphenylacetyl) - 2 - methyl - 5 - methoxy-3-indolylacetic acid, M.P. 169°–170° C.

*Microanalysis.*—Calculated (percent): C, 66.49; H, 5.83; N, 3.55. Found (percent): C, 67.00; H, 5.94; N, 3.61.

EXAMPLE 117

A mixture of 2 g. of N - (p - methoxyphenyl) - N -

(phenylacetyl) - 4 - amino - 3 - oxo - valeric acid and 1.3 g. of anhydrous zinc chloride was heated at 120°–140° C. for 40 minutes. After cooling, the mixture was extracted with 25 ml. of benzene, and the benzene layer was washed with water and dried on anhydrous sodium sulfate. Thereafter the mixture was concentrated under reduced pressure to dryness, and column-chloromatographed on silica gel by using ethyl acetate as developer to give 1 - phenylacetyl - 2 - methyl - 5 - methoxy - 3 - indolylacetic acid, M.P. 138°–139° C.

In a way similar to that in Example 117, the following compounds were prepared.

EXAMPLE 118

1 - cinnamoyl - 2 - methyl - 5 - methoxy - 3 - indolylacetic acid, M.P. 164°–165° C.

EXAMPLE 119

1 - ($\beta$ - 2 - furylacryloyl) - 2 - methyl - 5 - methoxy-3-indolylacetic acid, M.P. 163°–165° C.

EXAMPLE 120

3.0 g. of 3 - (2' - phenylacetylamino - 5' - methoxyphenyl)-levulinic acid was added to 60 ml. of dioxane and then 1 ml. of 10% hydrochloric acid was added thereto, and was heated at 80° C. with stirring. After completion of the reaction, a precipitate was filtered off and the filtrate was concentrated under reduced pressure to a solid substance. Recrystallization twice from acetone-water gave 1 - phenylacetyl - 2 - methyl - 5 - methoxy-3-indolylacetic acid, M.P. 138–140° C.

What is claimed is:

1. A compound of the formula:

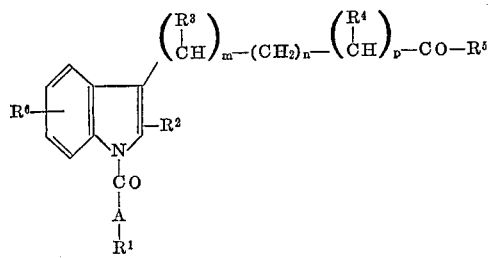

wherein $R^1$ is an unsubstituted phenyl, naphthyl, pyridyl, thienyl or furyl, $R^2$ and $R^3$ each are a hydrogen atom or alkyl having up to 3 carbon atoms, $R^4$ is a hydrogen atom, a carboxy or an alkoxycarbonyl having up to 4 carbon atoms, $R^5$ is an alkoxy having up to 4 carbon atoms, or a hydroxy group; $R^6$ is an alkyl having up to 4 carbon atoms, an alkoxy having up to 4 carbon atoms, an alkylthio having up to 4 carbon atoms, a chlorine atom or a hydrogen atom; A is an unsubstituted saturated hydrocarbon chain having up to 5 carbon atoms or an unsubstituted or methyl-substituted alkene chain having up to 5 carbon atoms, $m$ and $p$ each are 0 or 1; and $n$ is 0 or an integer of from 1 to 3.

2. A compound according to claim 1 wherein $R^2$ is alkyl, $R^3$ is hydrogen, $R^5$ is hydroxyl, $R^6$ is alkoxy, $m$ is 1 and $n$ and $p$ are 0.

3. A compound according to claim 1 wherein $R^2$ is alkyl, $R^3$ is hydrogen, $R^5$ is hydroxyl, $R^6$ is alkoxy, A is vinylene, $m$ is 1 and $n$ and $p$ are 0.

4. A compound according to claim 1 wherein $R^1$ is phenyl, $R^2$ is alkyl, $R^5$ is hydroxyl, $R^6$ is alkoxy, A is vinylene, $m$ is 1 and $n$ and $p$ are 0.

5. A compound according to claim 1 wherein $R^1$ is phenyl, furyl or thienyl, $R^2$ is alkyl, $R^3$ is hydrogen or alkyl, $R^5$ is hydroxyl, $R^6$ is alkoxy, A is vinylene, $m$ is 1 and $n$ and $p$ are 0.

6. A compound according to claim 1 wherein $R^2$ is alkyl, $R^3$ is hydrogen, $R^5$ is hydroxyl, $R^6$ is alkoxy, A is methylene, $m$ is 1 and $n$ and $p$ are 0.

7. A compound according to claim 1, wherein $R^6$ is alkoxy.

8. A compound according to claim 1 wherein $R^1$ is phenyl, $R^5$ is hydroxyl, $R^6$ is alkoxy and $p$ is 0.

9. A compound according to claim 1 wherein $R^5$ is hydroxyl, $R^6$ is alkoxy, $m$ is 1 and $n$ and $p$ are 0.

10. A compound according to claim 1 wherein $R^1$ is phenyl, $R^2$ is alkyl, $R^5$ is hydroxyl, $R^6$ is alkoxy, A is methylene, $m$ is 1 and $n$ and $p$ are 0.

11. 1-cinnamoyl-2-methyl - 5 - methoxy-3-indolylacetic acid.

12. $\alpha$-(1-cinnamoyl-2-methyl - 5 - methoxy-3-indolyl)-propionic acid.

13. 1-($\beta$-2-furylacryloyl)-2-methyl-5-methoxy-3-indolylacetic acid.

14. 1-($\beta$-2-thienylacryloyl) - 2 - methyl-5-methoxy-3-indolylacetic acid.

15. 1-($\alpha$-methylcinnamoyl) - 2 - methyl-5-methoxy-3-indolylacetic acid.

16. A compound according to claim 1, which is 1-($\beta$-phenylpropionyl)-2-methyl - 5 - methoxy-3-indolylacetic acid.

17. A compound according to claim 1, which is ethyl 1-cinnamoyl-2-methyl-5-methoxy-3-indolylacetate.

18. A compound according to claim 1, which is 1-phenylacetyl-2-methyl-5-methoxy-3-indolylacetic acid.

19. A process for producing a 3-indolyl aliphatic acid derivative of the formula:

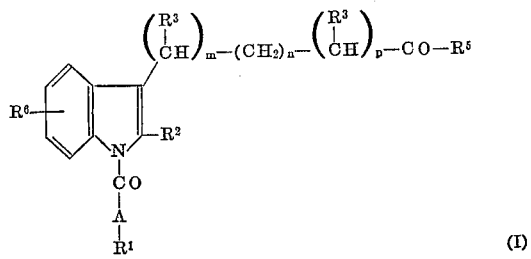

wherein $R^1$ is a phenyl, naphthyl, pyridyl, thienyl or furyl group, each of said phenyl and naphthyl groups being unsubstituted or substituted by one member selected from the group consisting of lower alkyl, lower alkoxy, lower alkylthio, nitro, cyano and halogen, each of said alkyl, alkoxy and alkylthio groups containing up to 4 carbon atoms; each of said pyridyl, thienyl and furyl groups being unsubstituted or substituted by one member selected from the group consisting of methyl, ethyl and halogen; $R^2$ and $R^3$ each are a hydrogen atom or alkyl having up to 3 carbon atoms; $R^4$ is a hydrogen atom, a carboxy or an alkoxycarbonyl having up to 4 carbon atoms; $R^5$ is an alkoxy having up to 4 carbon atoms, or a hydroxy group; $R^6$ is an alkyl having up to 4 carbon atoms, an alkoxy having up to 4 carbon atoms, an alkylthio having up to 4 carbon atoms, a nitro, an alkenyl having up to 4 carbon atoms, an alkenyloxy having up to 4 carbon atoms, a halogen atom or a hydrogen atom; A is an unsubstituted saturated hydrocarbon chain having up to 5 carbon atoms, an unsubstituted alkene chain having up to 5 carbon atoms, a halogen-substituted alkene chain having up to 5 carbon atoms, a halogen-substituted saturated hydrocarbon chain having up to 5 carbon atoms, a phenyl-substituted saturated hydrocarbon chain up to 5 carbon atoms or a phenyl-substituted alkene chain having up to 5 carbon atoms, the hydrocarbon and alkene chain being straight or branched; $m$ and $p$ each are 0 or 1; and $n$ is 0 or an integer of from 1 to 3, which comprises reacting at a temperature of 50–200° C. an $N^1$-acylated phenylhydrazine derivative of the formula:

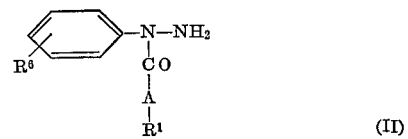

wherein $R^1$, $R^6$ and A have the same meanings as identified above with an aliphatic acid derivative of the formula:

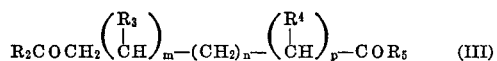 (III)

wherein $R^2$, $R^3$, $R^4$, $R^5$, $m$, $n$ and $p$ have the same meanings as identified above to yield the 3-indolyl aliphatic acid derivative (I).

References Cited
UNITED STATES PATENTS
3,161,654   12/1964   Shen _____ 260—326.12

ALEX MAZEL, Primary Examiner
J. A. NARCAVAGE, Assistant Examiner

U.S. Cl. X.R.

260—287, 295, 295.5, 326.11, 326.12, 326.16, 332.2, 347.3, 518, 558, 559, 562, 999

UNITED STATES PATENT OFFICE
CERTIFICATE OF CORRECTION

Patent No. 3,576,800      Dated April 27, 1971

Inventor(s) Hisao Yamamoto et al.

It is certified that error appears in the above-identified patent and that said Letters Patent are hereby corrected as shown below:

Column 1, line 9: change "41/42,272" to

--41/42,723--.

Column 1, line 16: insert the following two missing priorities --42/3532 filed January 17, 1967; 42/3962 filed January 20, 1967--.

Signed and sealed this 18th day of January 1972.

(SEAL)
Attest:

EDWARD M. FLETCHER, JR.
Attesting Officer

ROBERT GOTTSCHALK
Acting Commissioner of Patents